United States Patent
Brousmiche et al.

(10) Patent No.: US 12,338,300 B2
(45) Date of Patent: Jun. 24, 2025

(54) POLYMER PARTICLES WITH A GRADIENT COMPOSITION AND METHODS OF PRODUCTION THEREOF

(71) Applicant: Waters Technologies Corporation, Milford, MA (US)

(72) Inventors: Darryl W. Brousmiche, Grafton, MA (US); Kevin Daniel Wyndham, Worcester, MA (US); Mingcheng Xu, Lexington, MA (US); Michael F. Morris, Ashland, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 18/662,095

(22) Filed: May 13, 2024

(65) Prior Publication Data

US 2024/0301097 A1 Sep. 12, 2024

Related U.S. Application Data

(63) Continuation of application No. 16/287,364, filed on Feb. 27, 2019, now Pat. No. 11,999,808.

(60) Provisional application No. 62/635,699, filed on Feb. 27, 2018.

(51) Int. Cl.
| | |
|---|---|
| C08F 212/08 | (2006.01) |
| C08F 2/04 | (2006.01) |
| C08F 2/06 | (2006.01) |
| C08F 220/56 | (2006.01) |
| C08K 5/00 | (2006.01) |
| C08K 5/14 | (2006.01) |
| C08K 5/23 | (2006.01) |
| C08L 39/06 | (2006.01) |
| C08F 220/28 | (2006.01) |

(52) U.S. Cl.
CPC ............... *C08F 2/04* (2013.01); *C08F 2/06* (2013.01); *C08F 212/08* (2013.01); *C08F 220/56* (2013.01); *C08K 5/005* (2013.01); *C08K 5/14* (2013.01); *C08K 5/23* (2013.01); *C08L 39/06* (2013.01); *C08F 220/281* (2020.02); *C08L 2205/24* (2013.01); *C08L 2207/53* (2013.01)

(58) Field of Classification Search
CPC .. C08L 2207/53; C08F 212/08; C08F 285/00; C08F 220/325; C08F 220/32
See application file for complete search history.

(56) References Cited

U.S. PATENT DOCUMENTS

| | | | |
|---|---|---|---|
| 2005/0154140 A1* | 7/2005 | Hong | C08L 51/04 525/242 |
| 2009/0143528 A1* | 6/2009 | Mestach | C08F 265/02 427/508 |
| 2010/0036055 A1* | 2/2010 | Hayashi | C08F 293/00 525/70 |
| 2012/0128743 A1* | 5/2012 | Hawkett | C08F 285/00 977/773 |
| 2012/0157629 A1* | 6/2012 | Navarro | C08L 67/02 525/310 |
| 2013/0115185 A1 | 5/2013 | Tamareselvy et al. | |
| 2014/0316050 A1 | 10/2014 | Schrinner et al. | |
| 2015/0017451 A1 | 1/2015 | Nabuurs et al. | |
| 2015/0099843 A1 | 4/2015 | Hartig et al. | |
| 2017/0218095 A1* | 8/2017 | Modahl | C12N 11/087 |

FOREIGN PATENT DOCUMENTS

| | | | | |
|---|---|---|---|---|
| CA | 2353856 C | * | 10/2007 | B32B 27/30 |
| EP | 0755972 B1 | * | 9/1990 | C08L 25/06 |
| EP | 0560113 A1 | * | 9/1993 | C08F 257/02 |
| EP | 1350812 A2 | | 10/2003 | |
| EP | 1514883 A1 | * | 3/2005 | C08F 257/02 |
| EP | 1541603 A1 | | 6/2005 | |
| JP | H03237105 A | | 10/1991 | |
| WO | 2005026225 A1 | | 3/2005 | |
| WO | 2008148000 A1 | | 12/2008 | |

OTHER PUBLICATIONS

International Search Report and Written Opinion issued in International Application No. PCT/US2019/019844 dated May 24, 2019.
Perrier-Cornet et al. "Functional crosslinked polymer particles synthesized by precipitation polymerization for liquid chromatography." J. Chromatogr. A. 1179(2008): 2-8.
Tseng et al. J. Poly. Sci. A. 24(1986): 2995-3007.

* cited by examiner

*Primary Examiner* — Karuna P Reddy
(74) *Attorney, Agent, or Firm* — WOMBLE BOND DICKINSON (US) LLP; Deborah M. Vernon; Ricardo Joseph

(57) ABSTRACT

The current invention provides a novel method to synthesize a mono-disperse non-porous polymer particles with a unique gradient composition from the core to the shell. In particular, the present invention offers the flexibility to design the chemical and physical properties of different sections of the particle. This flexibility allows for significant latitude in the design of particles for analyzing a large variety of samples in different fields—through using these particles in different chromatography techniques including, but not limited to, ion exchange HPLC (e.g., bio-separation at different modes), reversed-phase HPLC, narrow bore and capillary HPLC, hydrophilic/hydrophobic interaction liquid chromatography, capillary electrochromatography separation, and two dimensional liquid chromatography.

6 Claims, 11 Drawing Sheets

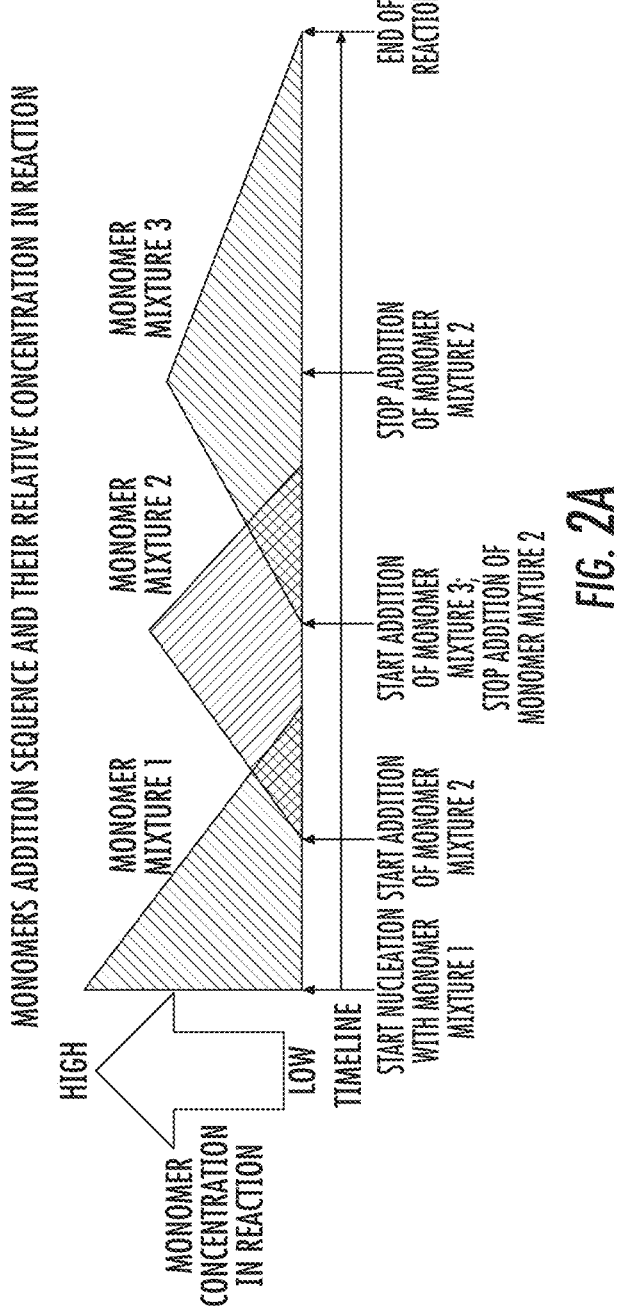

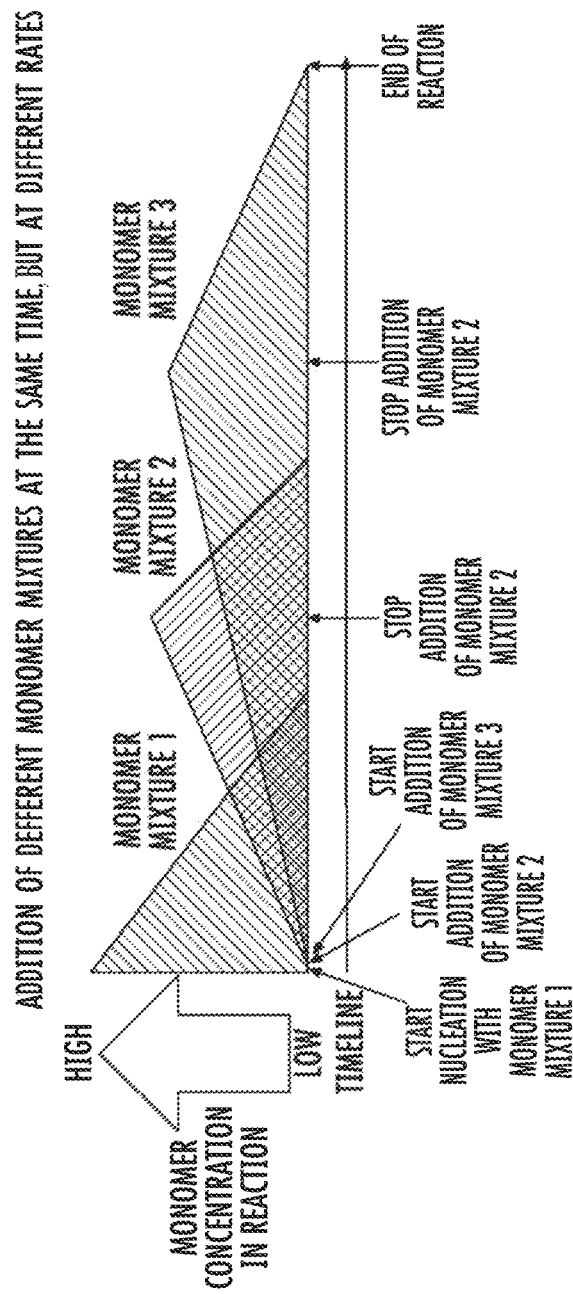

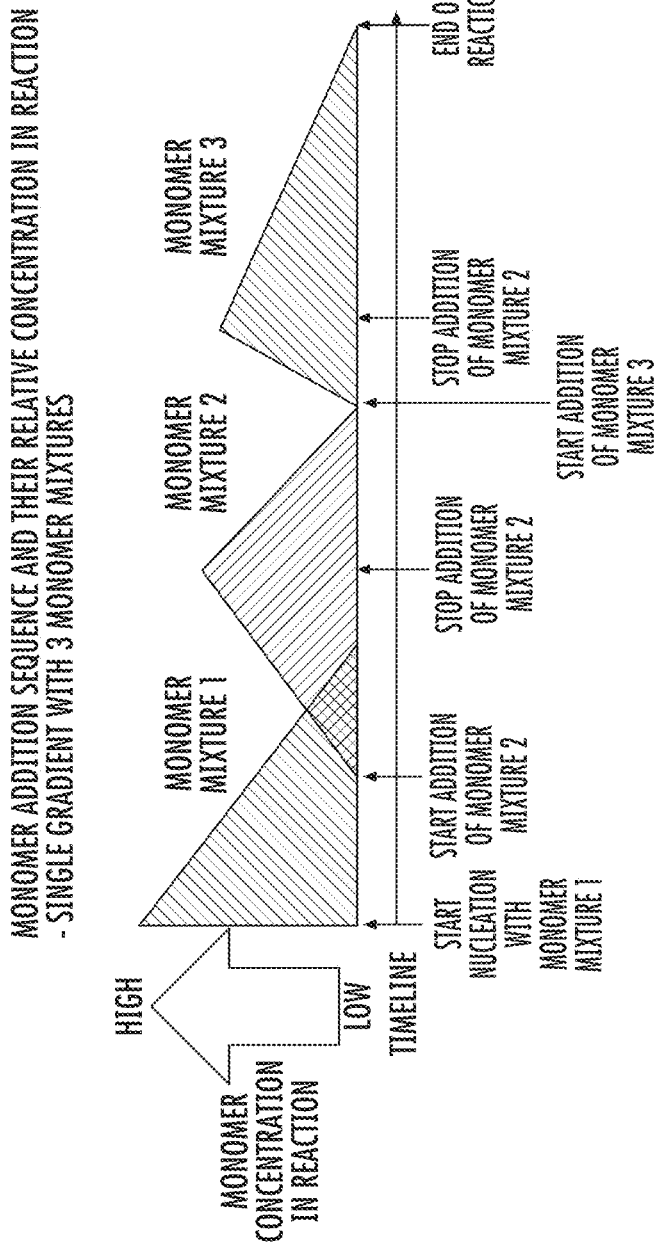

POLYMER PARTICLES WITH A GRADIENT COMPOSITION AND METHODS OF PRODUCTION THEREOF

CROSS REFERENCE TO RELATED APPLICATION

This application is a continuation of U.S. application Ser. No. 16/287,364 filed Feb. 27, 2019 entitled "POLYMER PARTICLES WITH A GRADIENT COMPOSITION AND METHODS OF PRODUCTION THEREOF" which claims the benefit of U.S. Provisional Application No. 62/635,699, filed Feb. 27, 2018 and entitled "POLYMER PARTICLES WITH A GRADIENT COMPOSITION AND METHODS OF PRODUCTION THEREOF", both of which are hereby incorporated by reference.

FIELD OF THE INVENTION

The present invention provides a novel method to synthesize mono-disperse non-porous polymer particles with a unique gradient composition from the core to the shell. The present invention offers the flexibility to design the chemical and physical properties of different sections of the particle, and this flexibility allows for significant latitude in the design of particles for various applications including bio-molecule separation, bio-molecule immobilization, bead array, special coating material, cell sorting material, ink and other new particles with specific surface properties.

BACKGROUND

Polymeric chromatography stationary phases are commonly used in separation of bio-molecules under different modes, such as ion exchange and hydrophobic interaction chromatography. Ion exchange (IEX) chromatography is used to separate ionic or ionizable molecules. The use of non-porous particles as packing materials improves column efficiency by limiting the diffusion path that molecules have to travel and, thus, improves their mass transfer kinetics.

The synthesis of polymer particles is dominated by using a heterogeneous polymerization process that begins initially either with a heterogeneous suspension or a homogeneous solution.

Suspension polymerization (E. Erbay and O. Okay, J. Appl. Poly. Sci. 71, (1999)1055-1062), starts with a heterogeneous suspension which contains two immiscible liquid phases, namely non-continuous or dispersion phase and continuous phase. The continuous phase is a solvent or a mixture of solvents with suspension stabilizer dissolved. Monomers, initiator and suitable porogenic solvents, if needed, are the main components in the non-continuous phase and are dispersed as small droplets with a very broad size distribution in the continuous phase by mechanical mixing, so that an oil-in-water or a water-in-oil suspension is present. Conventional suspension polymerization, by its nature, normally only leads to particles having a broad size distribution. To produce polymer particles with narrower size distribution, a modified suspension polymerization process, commonly termed as seeded or templated suspension polymerization, was first disclosed by Ugelstad (WO 83/03920, 1983) and then detailed in U.S. Pat. No. 4,530,956 (Ugelstad). Seeded polymerization uses a polymer latex with uniform size as shape templates. With the assistance of a multiple swelling process (U.S. Pat. No. 5,130,343, Frechet, 1992) if necessary, the non-continuous phase is swollen into the template prior to polymerization and is confined inside each swollen latex particle throughout the polymerization process. Once the particles are formed, the latex template is removed by washing with suitable solvents. The removal of shape templates and the use of swelling solvents make the method more useful in producing porous particles.

More recently, non-porous polymeric chromatographic packing materials are attracting more and more attention in the separation of biomolecules. To synthesize these highly crosslinked materials, a precipitation polymerization process, that starts with a homogenous mixture of monomers, initiator and solvents (J. Polym. Sci., Part A: Polym Chem., 1993, 31, 3257) has been used as a convenient, but unproductive method. In this process, the initial nuclei are formed by precipitation of the polymer chains. A carefully selected solvent, acetonitrile in most of the cases, maintains a highly swollen thin layer with many unreacted carbon-carbon double bond on the surface of the initial nuclei and then the particle. The highly swollen thin layer enables the continuous capture of oligomers from the solution, which co-polymerize with the double bonds on the surface to grow the particles (Macromolecules 1999, 32, 2838-2844). Due to the presence of the highly swollen thin layer acting as stabilizer, no additional stabilizer, but a very dilute solution, usually 1-2% is needed to avoid particles agglomeration.

Dispersion polymerization is a special precipitation polymerization process which was commonly used in producing non-crosslinked polystyrene latexes in alcoholic solvent at very high concentration (Can. J. Chem., 63, 1985). A modified dispersion process, by gradual addition of cross-linker to the reaction, demonstrated successfully the production of non-agglomerated poly(styrene-co-divinylbenzene) particles with low crosslinking density, a ratio of divinylbenzene (80%) to styrene less than 4/10 (J. Appl. Polym. Sci, Vol 109, 1189-1196).

The materials produced by the method described above and beyond all have chemically structured across particle dimension determined by the monomers used and their relative reactivity. A very complicated process established by D. H. Stover (J. Am. Chem. Soc. 2006, 128, 240-244) was capable of producing multilayered particles by using a multi-cycle of precipitation polymerization. In another prior art, a core-shell particle less than 350 nm was produced for ink applications. The core of the particle is either not crosslinked or low crosslinked (<10% by mass) characterized by a low glass transition temperature in the range of 50-110° C. (U.S. Pat. No. 6,858,301B2). The shell of the particle is a grafted polymer layer from a combination of hydrophilic and hydrophobic monomers. (U.S. Pat. No. 6,858,301B2.)

The current invention provides a novel method to synthesize mono-disperse non-porous 1-1000 µm polymer particles with a unique gradient composition from the core to the shell. In particular, the method provides a sequential addition of monomers at different stages of polymerization by either constant or varied addition rate, while radicals in the growing polymer chains or polymer particles are alive to react with the sequentially added monomers. As a result, the chemical composition from the inner core to the peripheral surface of the particle can be tuned as needed by changing either the feeding monomers composition, or the addition rate, or the order of addition, or the combinations to satisfy the needs of a given end-point application.

SUMMARY

The current invention provides a novel method to synthesize a mono-disperse non-porous polymer particles with a unique gradient composition from the core to the shell. In particular, the present invention offers the flexibility to design the chemical and physical properties of different sections of the particle. This flexibility allows for significant latitude in the design of particles for analyzing a large variety of samples in different fields—through using these particles in different chromatography techniques including, but not limited to, ion exchange HPLC, reversed-phase HPLC, narrow bore and capillary HPLC, hydrophilic/hydrophobic interaction liquid chromatography, capillary electrochromatography separation, and two dimensional liquid chromatography. For example, in ion exchange or hydrophobic interaction chromatography that uses aqueous buffer as mobile phase, a particle with a hydrophilic peripheral surface and a hydrophobic core (the core is resisting to swelling in water) is essential to maximize the mechanical strength as well as to minimize the non-specific binding. For one more example, in reverse phase chromatography that uses organic solvents as mobile phase, the bed instability of conventional polymeric packing material—caused by the swelling-shrink cycle, even at a minimum degree, with the change of mobile phase composition—limits the packing material's performance and life time; a particle with a core consisting of one or more gradient sections that is swelling resistance in different solvents can be utilized to overcome this drawback.

In one aspect, the object of the invention is achieved by providing a method of producing polymer particles comprising steps of: polymerizing monomers in a nucleation step to form non-crosslinked or low-crosslinked nucleus, wherein the nucleus contains live reactive sites for further polymerization; growing a particle from the nucleation step by adding a monomer mixture or a sequence of monomer mixtures with/without at least one crosslinker to form a chemical or physical gradient or multiple gradients polymer particle, wherein the polymer particle contains live reactive sites for further polymerization; and optionally polymerizing from the live reactive sites from the polymer particle to form a polymer particle with desired surface composition.

In one aspect, the polymer particle contains one or more than one layers of polymers with same or different gradient composition. In another aspect, there is no boundary between different layers of the present invention.

In one aspect, the polymer particle contains a peripheral layer with desired functionality for further modifications.

In one aspect, the polymer particle is a non-porous polymer particle.

In one embodiment, the present invention does not use a two liquid phase system when the process starts. In one embodiment, radical initiators and stabilizers are both dissolved homogeneously in a solution in the nucleation step. In one embodiment, the solvent system of the present invention is an alcohol solvent system.

In yet another embodiment, the mono-vinyl monomers, polyfunctional vinyl monomers, and hydrophilic monomers are introduced sequentially to form the polymer particle. And as a result, the chemical composition from the inner core to the peripheral surface of the particle can be tuned as needed by changing the feeding monomers to satisfy the need of a given end-point application.

In one embodiment, the mono-vinyl monomers are selected from a group consisting of acrylate, methacrylate, acrylamide, methacrylamide, acrylonitrile, styrenes, vinyl esters, vinyl ethers, vinyl halides, vinyl amines, vinyl amide and other vinyl monomers that is suitable for radical polymerization.

In another embodiment, the polyfunctional vinyl monomers are selected from a group consisting of polyfunctional acrylates, methacrylates, and aromatic vinyl monomers including, as non-limiting examples, ethylene glycol dimethacrylate and divinylbenzene.

In yet another embodiment, the hydrophilic monomers are selected from a group consisting of glycidyl methacyrlate, N-hydroxyethyl acrylamide, N-tris(hydroxymethyl)methyl] acrylamide, acrylamide, vinyl acetate, and other monomers bearing one or more hydrophilic functional moieties or hydrophilic precursors.

In another aspect, the object of the invention is achieved in producing mono-dispersed polymer particles using the method comprising steps of: polymerizing mono-vinyl monomers in a nucleation step; crosslinking polymers from the nucleation step using polyfunctional vinyl monomers to form a particle nucleus, wherein the particle nucleus contains live reactive sites for further polymerization; and polymerizing from the live reactive sites to form one or more polymer particle layers and a particle shell. In one embodiment, the particle shell contains functionalities that can be used for further surface modification.

It is surprisingly discovered that using the method disclosed in the present invention, mono-disperse non-porous or porous polymer particles can be produced with a diameter of 1 μm or higher.

In one embodiment, the polymer particles have a size distribution, represented by a ratio of 90% cumulative volume diameter divided by the 10% cumulative volume diameter, smaller than 1.3. In one embodiment, the polymer particles have a unique gradient composition across the radius from the particle nucleus to the shell, wherein the composition gradient includes, but not limited to, hydrophobic/hydrophilic gradient, crosslinking ratio gradient, functional group gradient, charge ratio gradient, density gradient, or a combination thereof. In one embodiment, the particle shell contains functionalities that can be used for further surface modification.

In one specific embodiment, the polymer particle has a hydrophobic core and one or more hydrophilic polymer layers. In another specific embodiment, the polymer particle has a hydrophobic core and multiple polymer layers of hydrophilic or hydrophobic materials. In yet another specific embodiment, the polymer particle has a hydrophobic core and multiple layers of polymers with different charge ratios. In another aspect, there is no boundary between different layers of the present invention.

In one specific embodiment, the polymer particle has a core that is 10% (by mass) crosslinked or higher.

In yet another embodiment, mono-disperse non-porous polymer particles according to the present invention can used for a chromatographic column.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein:

FIG. 2A illustrates monomers addition sequence and monomers concentration in producing the polymer particle;

FIGS. 3A-G illustrates different examples of monomers addition sequence and monomers concentration in producing the polymer particle.

DETAILED DESCRIPTION

Figure 1:
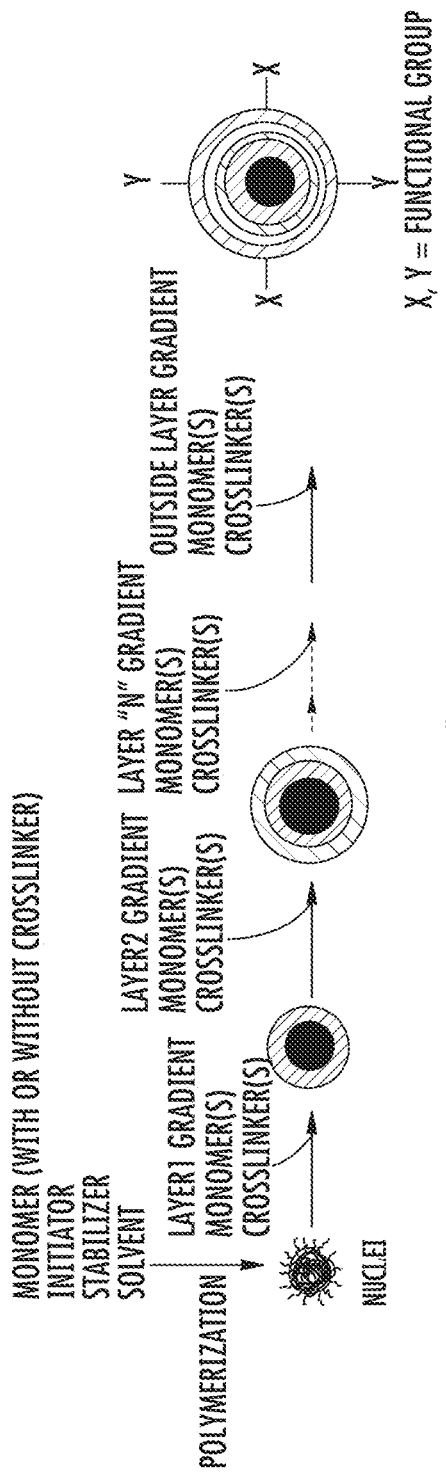
FIG. 1 illustrates base particle synthesis.

The present invention is directed to polymeric particles with novel programmable composition to satisfy various end-use applications, such as bio-molecule separation, bio-molecule immobilization, bead array, special coating material, cell sorting material, ink and other new particles with specific surface properties. In one example, the present invention is directed to monodisperse chromatographic packing materials for bio-separation with high performance, good reproducibility and long lifetime.

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

It should also be understood that, unless clearly indicated to the contrary, in any methods claimed herein that include more than one step or act, the order of the steps or acts of the method is not necessarily limited to the order in which the steps or acts of the method are recited.

Definitions

"Ion-exchange" as in "Ion-exchange chromatography" involves the separation of ionizable molecules based on their total charge. This technique enables the separation of similar types of molecules that would be difficult to separate by other techniques because the charge carried by the molecule of interest can be readily manipulated by changing buffer pH or conductivity. Without limitation, the chromatographic materials of the invention are useful for ion-exchange chromatography.

"Surface modifiers" include (typically) organic functional groups which impart a certain chromatographic functionality to a chromatographic stationary phase.

The language "surface modified" is used herein to describe the composite material of the present invention that possess organic and/or silanol groups which may additionally be substituted or derivatized with a surface modifier. "Surface modifiers" include (typically) organic functional groups which impart a certain chromatographic functionality to a chromatographic stationary phase. Surface modifiers such as disclosed herein are attached to the base material, e.g., via derivatization or coating and later graft polymerization, imparting the chemical character of the surface modifier to the base material. In one embodiment, the organic groups of a base material, e.g., particle, react to form an organic covalent bond with a surface modifier. The modifiers can form an organic covalent bond to the material's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. A variety of synthetic transformations are well known in the literature, see, e.g., March, J. Advanced Organic Chemistry, 3rd Edition, Wiley, New York, 1985.

As used herein the term "90/10 ratio" refers to the ratio of the particle size distribution of a particulate material of the invention. In the 90/10 ratio, the particle sizes of the material is measured and plotted on an S-curve. The particle size value of represented by 90% of the particles (i.e. the value for which 90% of the particles are equal to or smaller than) is compared as a ratio to the particle size value represented by 10% of the particles (i.e., the value for which 10% of the particles is equal to or smaller than).

As used herein the term "gradient" or "gradient composition" refers to the composition of the particles as viewed from the center of the particle to the particle surface. A particle having a gradient composition comprises a core or nucleus, an internal portion and a surface. In a gradient polymer particle, the composition of the nucleus, internal portion, and surface is varied based on the order and concentration of monomers added in a predetermined pattern such that there is composition variance along the radius of the particle but without the formation of discrete shells of material.

A "predetermined pattern" refers to the composition of a gradient particle which has been synthesized such that particular properties are present in the particle at particular locations as measured from the center of the particle to the particle surface. The predetermined pattern can include variations of composition, percent of crosslinking, thermal stability, physical stability, or any other property as is desired by one of ordinary skill in the art.

Polymer Particle Synthesis

The present invention offers a method with the capability to prepare polymer particles with gradient chemical composition from particle core to shell with desired properties.

The particle synthesis process, as illustrates in FIG. 1, includes polymerizing monomers in a nucleation step to form non-crosslinked or low-crosslinked nucleus, wherein the nucleus contains live reactive sites for further polymerization; growing particles from the nucleation step by adding a monomer mixture or a sequence of monomer mixtures with/without at least one crosslinker to form a chemical or physical gradient or multiple gradients polymer particle, wherein the polymer particle contains live reactive sites for further polymerization; and optionally polymerizing from the live reactive sites from the polymer particle to form a polymer particle with desired surface composition.

In one aspect, the polymer particle contains one or more than one layer of polymers with same or different gradient composition, and optionally, each gradient composition is further crosslinked. In one embodiment, the polymer particles have a unique gradient composition from the core to the shell, wherein the composition gradient includes, but not limited to, hydrophobic/hydrophilic gradient, crosslinking ratio gradient, functional group gradient, charge ratio gradient, density gradient, or a combination thereof. In one embodiment, the particle shell contains functionalities which meet end use applications or that can be used for further surface modification.

Figure 2B:
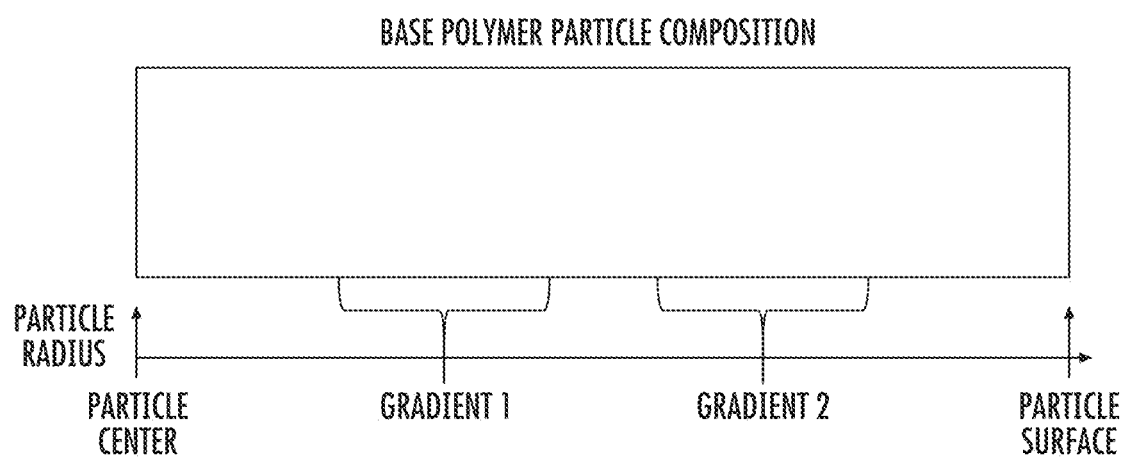
FIG. 2B illustrates gradient polymer particle composition.
Figure 3A:
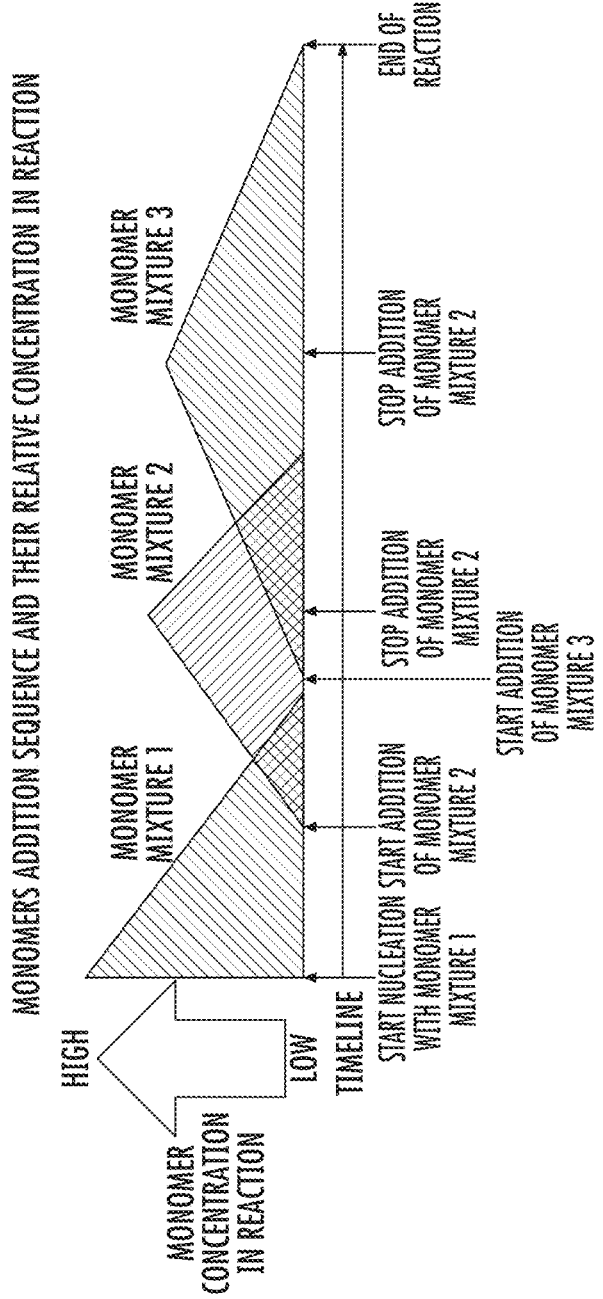
Figure 3B:
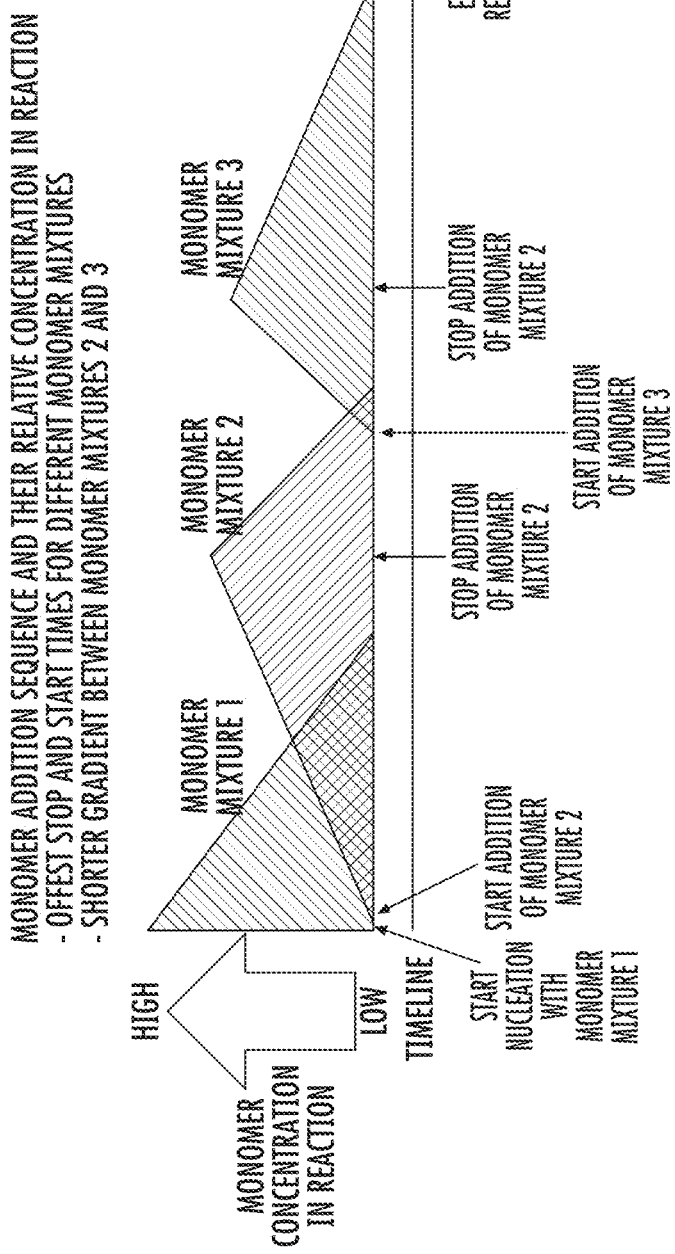
Figure 3D:
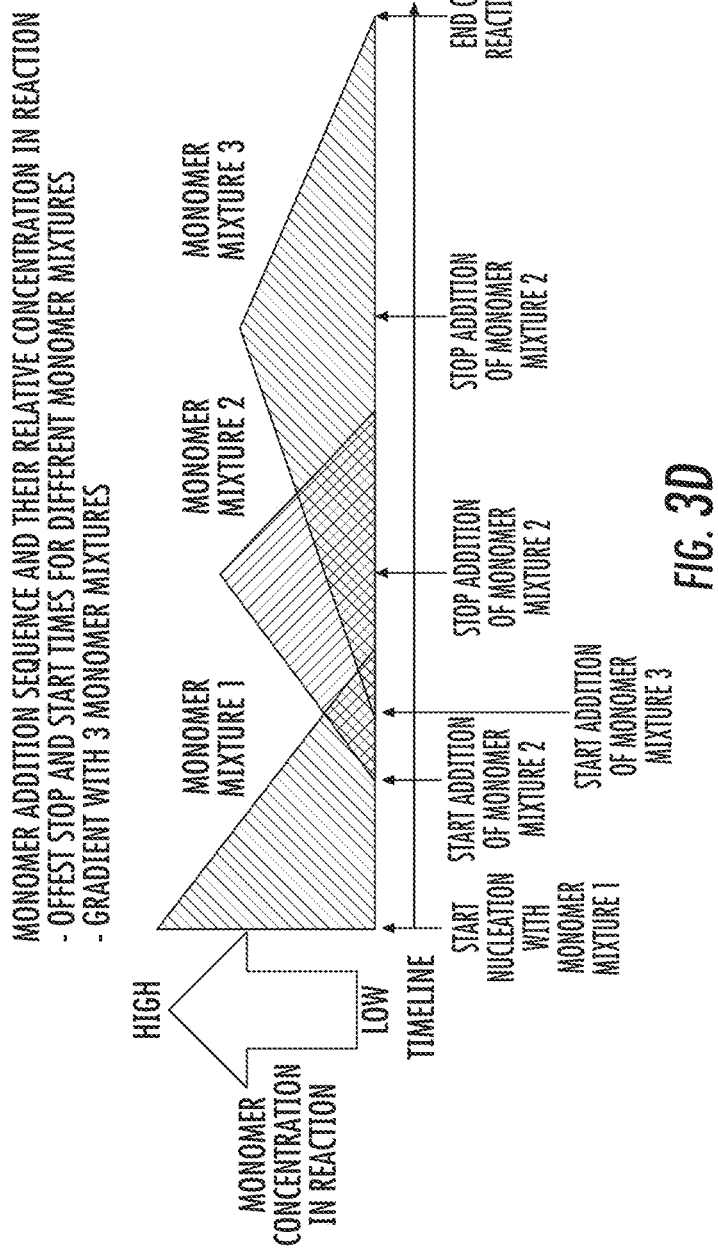
Figure 3E:
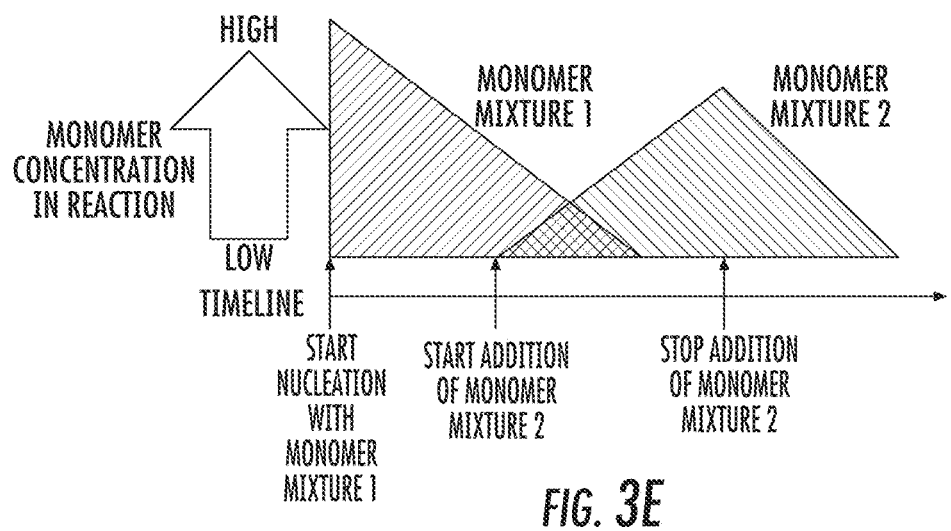
Figure 3G:
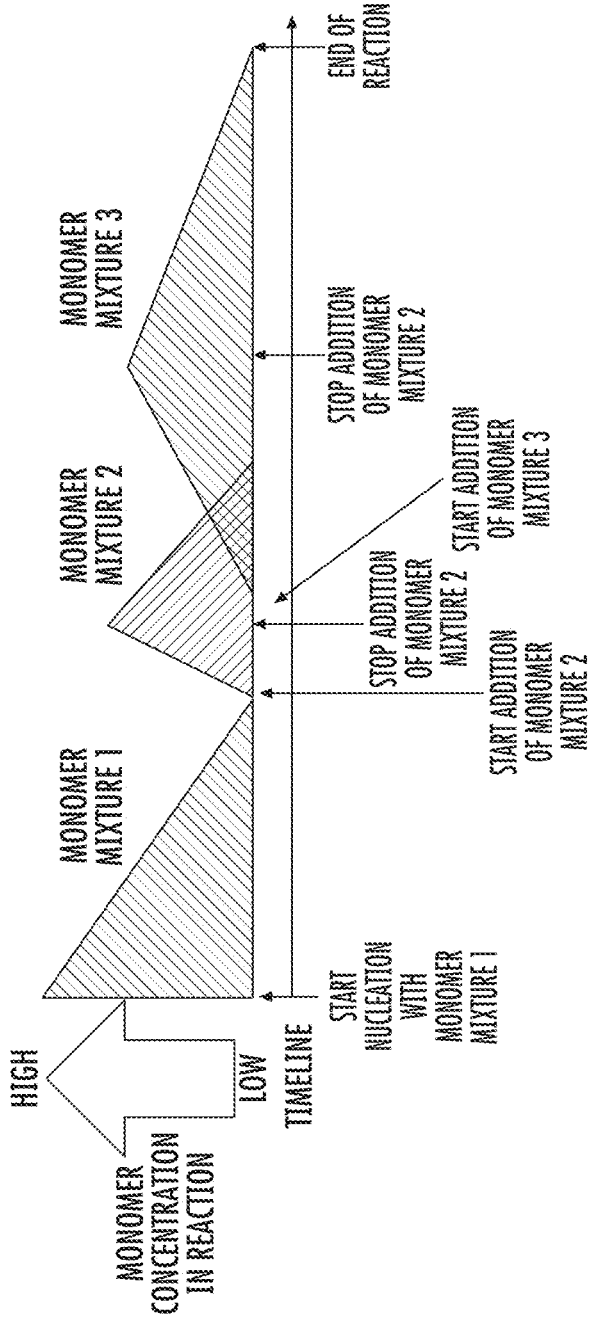

The formation of the polymer particles having a unique gradient composition is further illustrated in FIG. 2, as a non-limiting example. FIG. 2A illustrates an example of three monomer mixtures addition sequence and their relative concentration in a reaction mixture. In step one, monomer 1 mixture is added all together, and is consumed as the reaction progress; in step 2, monomer 2 mixture is added with a controlled addition rate, and reaches a maximum solution concentration at the end of the monomer 2 addition; in step 3, optionally after the addition of the monomer 2, monomer 3 mixture is then added with a controlled addition rate. The reaction continues until all or most of the monomers in the reaction mixture are consumed. FIG. 2B provides a schematic illustration of polymer particles with three layers of different gradient composition: the inner layer corresponds to polymers of monomer 1 mixture, the middle layer corresponds to polymers of monomer 2 mixture, and the outer layer corresponds to polymers of monomer 3 mixture. As illustrated in FIG. 2B, there is no clear boundary between different layers because of the addition sequence, time, and rate of different monomer mixtures.

FIG. 3 provides additional examples of monomers addition sequence and their relative concentration in a reaction mixture. FIG. 3A illustrates that monomer mixture 2 is added shortly after the start of monomer mixture 1 reaction; FIG. 3B illustrates that monomer mixture 3 is added close to the end of the monomer 2 reaction, which would provide relatively sharper boundary between these components in the polymer particle; FIG. 3C illustrates that both monomer mixtures 2 and 3 are added shortly after the start of monomer mixture 1 reaction with different addition rate; FIG. 3D illustrates that both monomer mixtures 2 and 3 are added close to the end of the monomer 1 reaction with different addition rate; FIG. 3E illustrates a single gradient with 2 monomer mixtures additions; FIG. 3F illustrates a single gradient with 3 monomer mixtures additions, where the monomer mixtures 3 is added after the consumption/reaction of monomer mixtures 2; FIG. 3G illustrates a single gradient with 3 monomer mixtures additions, where the monomer mixtures 2 is added after the consumption/reaction of monomer mixtures 1. As illustrated in these examples, the polymer particle contains one or more than one layer of polymers with same or different gradient composition can be controlled by adjusting the monomers addition sequence, time, and rate.

In one specific embodiment, the polymer particle has a hydrophobic core and one or more hydrophilic polymer layers. In another specific embodiment, the polymer particle has a hydrophobic core and multiple polymer layers of hydrophilic or hydrophobic materials. In yet another specific embodiment, the polymer particle has a hydrophobic core and multiple layers of polymers with different charge ratios. In another aspect, there is no boundary between different layers of the present invention.

In one aspect, the polymer particle contains a peripheral layer with desired functionality for further modifications.

In one aspect, the polymer particle is a non-porous polymer particle.

The monomers used in the nucleation step are not particularly limited. Any mono-vinyl monomer or any other monomer with at least two carbon-carbon double bonds and capable of being dissolved in an organic solvent may be used alone, or in a mixture of such polymers.

In certain embodiments, mono-vinyl monomers used in the nucleation step include, but are not limited to acrylate, methacrylate, acrylamide, methacrylamide, acrylonitrile, styrenes, vinyl esters, vinyl ethers, vinyl halide, vinyl amines, vinyl amide and other vinyl monomers that are suitable for radical polymerization.

The crosslinking monomers include but are not limited to polyfunctional acrylates, acrylamide, methacrylates such as ethylene glycol dimethacrylate, and aromatic vinyl monomer such as divinylbenzene, acrylamide based hybrid monomers containing silane such as 3-acrylamidopropyltrimethoxysilane and 3-acrylamidopropyltris (trimethylsiloxy)silane, acrylate based hybrid monomers containing silane such as (2-acryloxyethoxy)trimethylsilane, N-(3-acryloxy-2-hydroxypropyl)-3-aminopropylethoxysilane and (3-acryloxypropyl)trichlorosilane, allyl based hybrid monomers such as allyltrimethylsilane and allyltriphenylsilane. Monomers used for hydrophilic primer coating include but are not limited to glycidyl methacyrlate, N-hydroxyethyl acrylamide, N-[tris(hydroxymethyl) methyl] acrylamide, acrylamide, vinyl acetate, and other monomers bearing one or more hydrophilic functional moieties or hydrophilic precursors.

The monomers used as crosslinkers are not particularly limited. Any monomer comprising two or more vinyl groups and capable of being dissolved in an organic solvent may be used alone, or in combination thereof.

The temperature and the time required for the polymerization in the nucleation step and the growing step depends upon the kind of the monomers to be reacted and the kind of the polymerization initiator, and are generally 40° C. to 100° C. and about 0.5 to 40 hours, respectively.

The obtained particles contain a peripheral layer with desired functionality for further modifications. In one embodiment, the peripheral layer contains hydrophilic compositions that have low non-specific binding to bio-molecules. As an example, the particles with hydroxyl or epoxy groups on the surface can react with epoxy compounds under either Lewis acidic condition or basic condition to form a thin hydrophilic polymeric layer. Ion exchangers, HIC or other chromatography packing material can be prepared from those particles by grafting as well as other surface modification methods.

The stabilizers utilized in the nucleation step and/or growing step are not particularly limited, and the stabilizers may be any components that are not reactive to monomer or polymer components. Any stabilizer capable of being dissolved in an organic solvent may be used alone, or in a mixture of such stabilizers. In particular embodiments, the stabilizer is a surfactant or a mixture of surfactants. In specific embodiments, the stabilizer is PVP-40, PVP-360, Triton N, or a mixture thereof. In other embodiments, the stabilizer is carboxymethyl cellulose or polyvinyl alcohol.

The radical initiators utilized in the nucleation step and/or growing step are not particularly limited. Any radical initiators capable of being dissolved in an organic solvent may be used alone, or in a mixture of such radical initiators. In particular embodiments, the radical initiators are capable of being heat activated. In specific embodiments, the radical initiator is a peroxide, a peroxyacetate, a persulfate, an azo initiator or a mixture thereof.

Monomers, solvents, co-solvents, and radical initiators which may be utilized in the production methods of the invention are generally known in the art. See, for example U.S. Pat. Nos. 5,292,818, 5,324,752, 6,423,666, 6,858,301, 7,265,159, and 7,540,962; and U.S. Patent Application Publication Nos. US 2007/193954, US 2014/370614, US 2002/

155090, and US 2012024791; the disclosures of each of which are incorporated herein by reference.

In each step of the preparation of the polymer particles of the invention, the composition of the monomers, both type and concentration, may be varied such that a gradient chemical composition is formed. Such gradient compositions may have higher or lower glass transition temperatures, degrees of crosslinking, or other properties in predetermined areas in a predetermined pattern.

Further, in each step of the preparation of the polymer particles of the invention, the sequence, timing, and rate of monomers addition may be varied such that a gradient chemical composition is formed. For example, when two monomers are added in a specific synthetic step, the monomers may be added together from a pre-dissolved solution mixture, or added separately from two pre-dissolved solutions with different addition rate. The rate of monomer addition can be linear or non-linear.

In certain embodiments, the polymer particles of the invention are spherical, granular or irregular materials. In certain embodiments, the polymer particles of the invention have a highly spherical morphology; a rod shaped morphology; a bent-rod shaped morphology; a toroid shaped morphology; or a dumbbell shaped morphology.

Figure 4:
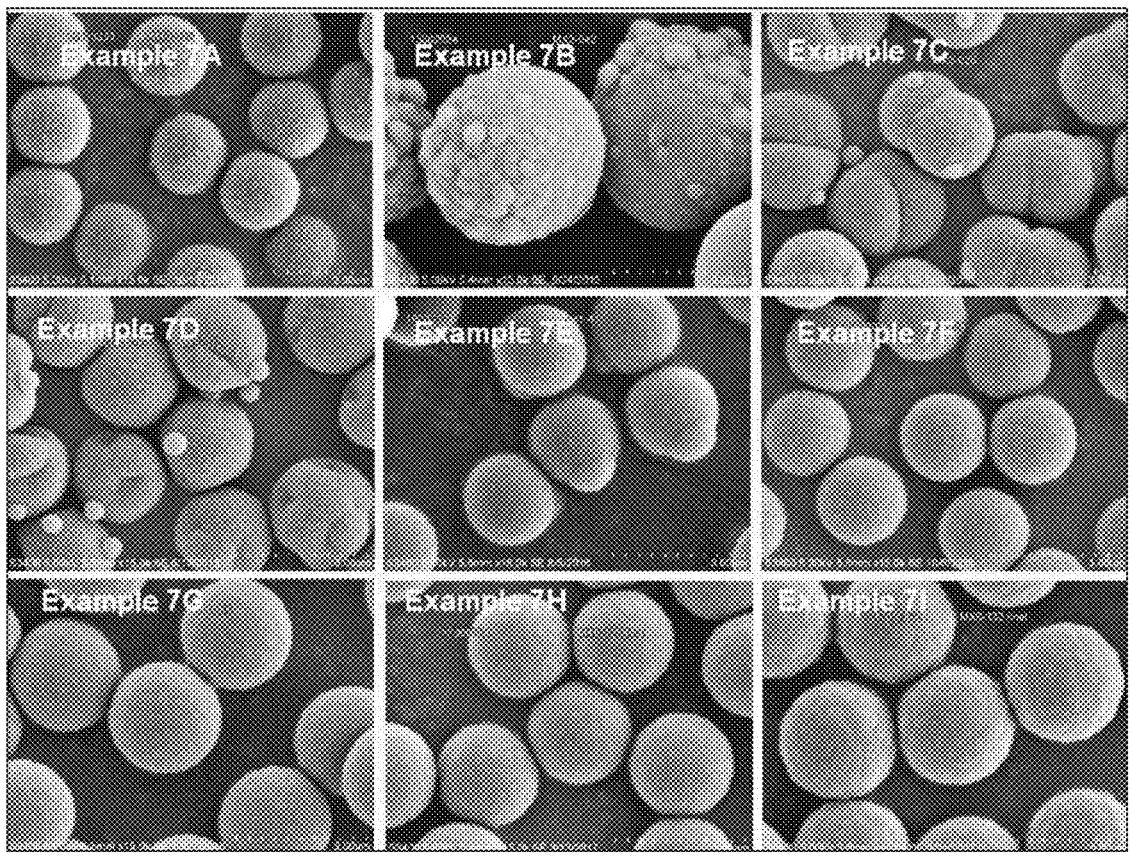
FIG. 4 illustrates different particle surface morphologies.

In certain embodiments, the polymer particles of the invention have different surface roughness or morphologies. For example, as illustrated in FIG. 4, the surface roughness or geometry may further be controlled by experimental conditions. In one aspect, the surface roughness or morphologies lead to polymer particles with different surface area.

In certain embodiments, the polymer particles of the invention have a particle size from 0.5-100 μm; 1-50 μm; 1.5-10 μm; or 1.7-5 μm.

In certain embodiments, the particle nucleus has a diameter of greater than 0.1 μm; greater than 0.11 μm; greater than 0.125 μm; greater than 0.15 μm. In certain embodiment, the particle nucleus has a diameter of greater than 25% of the targeted particle diameter.

In certain embodiments, the particle nucleus has a degree of crosslinking of more than 10% by mass; more than 15% by mass; more than 20% by mass; more than 30% by mass; more than 40% by mass; more than 50% by mass; or more than 60% by mass. In other embodiments, the particle nucleus is not crosslinked.

Solvents and Co-Solvents

One benefit to the methods of production of the invention is the use of a homogenous solution system for the entire production of the particles. Though the solution system can be modified during the various phases of production, the solution system will remain homogenous.

Thus, in one aspect, the methods of production of the invention utilize a homogenous organic solvent system, and the type of the organic solvent is not particular limited. In certain embodiments, the solvent is an alcohol solvent. In particular embodiments, the alcohol solvent is methanol, ethanol, propanol, isopropanol, n-butanol, iso-butanol, sec-butanol, tert-butanol, or a mixture thereof. In certain embodiments, the solvent is a reagent alcohol, which includes but not limited to absolute alcohol (200 proof), or denatured alcohol (e.g., denatured with methanol, isopropanol, toluene, and/or methyl ethyl ketone).

In certain aspects the solvent system utilizes one or more co-solvents which act to solubilize different monomer components during the preparation of the predetermined pattern or gradient. Such co-solvents are not particularly limited provided that the co-solvent is an organic solvent capable of forming a homogenous solvent system with the organic solvent.

Examples include aromatic hydrocarbons such as toluene, xylene, diethylbenzene and dodecylbenzene; saturated hydrocarbons such as hexane, heptane, octane and decane; and alcohols such as isoamyl alcohol, hexyl alcohol and octyl alcohol.

In certain embodiments the co-solvent is cyclohexane, toluene, methylcyclohexane, isooctane, acetonitrile, acetone, ethyl acetate, isopropyl acetate, tetrahydrofuran, methyltetrahydrofuran, a xylene solvent, a glycol solvent or a mixture thereof.

Chromatographic Columns and Separations Devices

Another aspect provides a variety of separations devices having a stationary phase comprising the polymer particles as described herein. The separations devices include, e.g., chromatographic columns, thin layer plates, filtration membranes, sample cleanup devices and microtiter plates. The separations devices can be used for a variety of separations techniques including, but not limited to, ion-exchange separations.

In a particular aspect, the invention provides a chromatographic column comprising
  a) a column having a cylindrical interior for accepting a packing material, and
  b) a packed chromatographic bed comprising the polymer particles as described herein.

The invention also provides for a kit comprising the polymer particles as described herein and instructions for use. In one embodiment, the instructions are for use with a separations device, e.g., chromatographic columns, thin layer plates, filtration membranes, sample cleanup devices and microtiter plates.

Ion-Exchange Chromatography

In another aspect, the invention provides a method for performing ion-exchange chromatography using the polymer particles as described herein.

Accordingly, the invention provides a method for analyzing a sample comprising a biological molecule and one or more additional component, which method comprises:
  (a) contacting the sample with a stationary phase comprising a polymer particle as described herein to bind the biological molecule to the polymer particle;
  (b) removing the one or more additional components from the sample by contacting the stationary phase with a first eluent to elute the one or more additional components;
  (c) washing the stationary phase with a buffer wherein the buffer produces a change in conductivity and/or pH the first eluent so as to unbind the biological molecule from the polymer particle; and
  (d) eluting the biological molecule the sample by contacting the stationary phase with a second eluent to elute the biological molecule.

In certain embodiments, the method of analysis further involves a step of identifying the biological molecule or quantifying the biological molecule.

In certain embodiments, the biological material is an intact protein, a denatured protein, a modified protein, an oligonucleotide, a modified oligonucleotide, a single-stranded oligonucleotide, a double-stranded oligonucleotide, DNA, RNA, or a peptide. In a particular aspect, the biological material is an inclusion body, a biological fluid, a biological tissue, a biological matrix, an embedded tissue sample, or a cell culture supernatant.

EXAMPLES

The present invention may be further illustrated by the following non-limiting examples describing the chromatographic materials synthesized by a process in which the raw materials are added sequentially. As a result, the materials have a gradient composition depending the order of materials added during the process. The composition of the material can be designed based upon the end application.

Materials

All the monomers were purchased from Sigma Aldrich and inhibitors in monomers were removed before use: styrene, ≥99%; divinylbenzene 80% (DVB 80), technical grade; glycidyl methacrylate (GMA), >97%; ethylene glycol dimethacrylate (EDMA), 98%; methyl methacrylate (MMA), 99%; 2-hydroxyethyl methacrylate (HEMA), 97%; 4-chloromethyl styrene (VBC), 90%; 4-acetoxyl styrene (4-ATST), 96%; 2-hydroxyethyl acrylamide (HEAM), 97%; vinyl acetate (VAc), 99%; N-methoxypropyl acrylamide (MPAA), 95%; N,N'-dimethyl acrylamide, 99%. The inhibitors in monomers including styrene, divinylbenzene 80% (DVB 80), glycidyl methacrylate (GMA), methyl methacrylate (MMA), 2-hydroxyethyl methacrylate (HEMA), 4-chloromethyl styrene (VBC) and 4-acetoxyl styrene (4-ATST) were removed by passing the monomers through a column packed with neutral alumina. The inhibitors in other monomers, such as 2-hydroxyethyl acrylamide (HEAM), vinyl acetate (VAc), N-methoxypropyl acrylamide (MPAA), N,N'-dimethyl acrylamide, were removed by passing the monomers through a column packed with activated carbon. All other reagents were used as received.

Characterization

Those skilled in the art will recognize that equivalents of the following instruments and suppliers exist and, as such, the instruments listed below are not to be construed as limiting.

The % C, % H, % N values were measured by combustion analysis (CE-440 Elemental Analyzer; Exeter Analytical Inc., North Chelmsford, MA). The specific surface areas (SSA), specific pore volumes (SPV) and the average pore diameters (APD) of these materials were measured using the multi-point N2 sorption method (Micromeritics ASAP 2400; Micromeritics Instruments Inc., Norcross, GA). The SSA was calculated using the BET method, the SPV was the single point value determined for $P/P_0 > 0.98$ and the APD was calculated from the desorption leg of the isotherm using the BJH method. Scanning electron microscopic (SEM) image analyses were performed (JEOL JSM-5600 instrument, Tokyo, Japan) at 7 kV. Particle sizes were measured using a Beckman Coulter Multisizer 3 analyzer (30 μm aperture, 70,000 counts; Miami, FL). The particle diameter (dp) was measured by SEM or by using a Beckman Coulter as the 50% cumulative diameter of the volume based particle size distribution. The width of the distribution was measured as the 90% cumulative volume diameter divided by the 10% cumulative volume diameter (denoted $d_{v90}/d_{v10}$ ratio).

A crosslinker was defined as a molecule that contains at least two polymerizable groups in the molecule under the conditions described in the examples. The weight percentage of crosslinking in each section of the particle was calculated based on the amount of monomers used in the formulation following the equation below.

$$\frac{\text{weight of crosslinker}}{\text{Total weight of mono functional monomer}} \times 100\%$$

Ionic Capacity in the Ion-Exchangers was Determined by Acid-Base Titration.

The percentage of poly(GMA/EDMA) in the particle was calculated from the FTIR spectra of the particles following the procedure as described. (1) Perform FTIR spectroscopy of a series of calibration samples with different blending ratio of 2 μm poly(GMA/EDMA) particle to 2 μm poly (Styrene/DVB) particle; (2) Determine the ratio of peak height of the carbonyl stretch at 1727 cm$^{-1}$ to benzene ring stretch at 700 cm$^{-1}$ in FTIR spectrum for each calibration sample. (3) Obtain a calibration equation of the blending ratio against FTIR two peak height ratio; (4) Perform FTIR spectroscopy of the unknown sample and determine the peak height of the carbonyl stretch at 1727 cm$^{-1}$ to benzene ring stretch at 700 cm$^{-1}$ in FTIR spectrum of the unknown sample. (5) Calculated the percentage of poly(GMA/EDMA) in particle by applying the FTIR peak height ratio from the unknown sample in the calibration equation.

SYNTHETIC EXAMPLES

Example 1

Example 1A to example 1I describe the synthesis of polymer particles with poly(styrene-DVB) as a nucleus with a gradient that gradually goes from poly(styrene-DVB) at the nucleus to a particle surface consisting mainly of poly (GMA/EDMA). The examples IA to 1I show the flexibility of adjustment of crosslinker type and percentage in different section of particle.

Step one: in a typical particle synthesis process (example IA), 561.1 g of reagent alcohol (90% ethanol, ~5% methanol and ~5% isopropanol), 16.9 g of polyvinylpyrrolidone (PVP-40, average molecular weight 40,000), 1.6 g of 2,2'-Azobis(2-methylpropionitrile) (AIBN), 6.7 g of Triton™ N-57, 80.1 g of styrene and 2.4 g of poly(propylene glycol) dimethacrylate (average molecular weight 560) were charged into a reactor. After purging with nitrogen, the reaction mixture was heated to 70° C. with stirring and was held at 70° C. until the completion of all the reaction steps.

Step two: after the step one reaction mixture was held at 70° C. for 3 hours, a solution containing 52.0 g of DVB 80, 24.0 g of styrene, 51.0 g of PVP-40, 1080.4 g of reagent alcohol (90% ethanol, ~5% methanol and ~5% isopropanol) and 54.1 g of p-xylene was added to the reaction mixture at a constant flow rate over two hours.

Step three: after the completion of solution charge in step two, a primer coating solution containing 31.2 g of glycidyl methacrylate (GMA), 6.2 g of ethylene glycol dimethacrylate (EDMA), 12.9 g of PVP-40 and 381.9 g of reagent alcohol (90% ethanol, ~5% methanol and ~5% isopropanol) was added to the reaction mixture at a constant flow rate over 1.5 hours.

After the reaction mixture was held at 70° C. for a total of 20 hours, the particles were separated from the reaction slurry by filtration. The particles were then washed with methanol, followed by tetrahydrofuran (THF), and followed by acetone.

The final product was dried in vacuum oven at 45° C. overnight. 91.8 g of monodisperse 2.3 μm polymer particles were obtained.

Additional reaction data is listed in Table 1.

Analytical data for material 1A to material 1I is listed in Table 2. The percentage of poly(GMA/EDMA) primer in the particle was determined by FTIR as described in the characterization section.

TABLE 1

Formulation of materials 1A to 1I

| | Necleation solution, g | | | | | | Crosslinking solution, g | |
|---|---|---|---|---|---|---|---|---|
| | | PPG | | | Triton ™ | Reagent | | |
| Example | Styrene | DMA | AIBN | PVP-40 | N-57 | alcohol | DVB80 | Styrene |
| 1A | 80.1 | 2.4 | 1.6 | 16.9 | 6.7 | 561.1 | 52.0 | 24.0 |
| 1B | 77.0 | 2.3 | 1.6 | 16.4 | 6.5 | 538.0 | 66.1 | 11.0 |
| 1C | 77.1 | 2.3 | 1.6 | 16.1 | 6.5 | 538.0 | 77.0 | 0.0 |
| 1D | 96.0 | 3.0 | 1.9 | 20.1 | 8.1 | 668.0 | 96.0 | 0.0 |
| 1E | 77.0 | 2.3 | 1.6 | 16.1 | 6.5 | 538.0 | 77.1 | 0.0 |
| 1F | 77.1 | 2.3 | 1.5 | 16.1 | 6.5 | 538.0 | 77.1 | 0.0 |
| 1G | 72.1 | 2.2 | 1.4 | 15.1 | 6.1 | 503.5 | 72.1 | 0.0 |
| 1H | 72.1 | 2.2 | 1.4 | 15.1 | 12.1 | 504.1 | 72.0 | 0.0 |
| 1I | 96.1 | 2.9 | 1.9 | 20.0 | 16.0 | 668.9 | 96.1 | 0.0 |

| | Crosslinking solution, g | | | Primer coating solution, g | | | | |
|---|---|---|---|---|---|---|---|---|
| Example | PVP-40 | Reagent alcohol | p-Xylene | GMA | EDMA | PEG DMA | PVP-40 | Reagent alcohol |
| 1A | 51.0 | 1080.4 | 54.1 | 31.2 | 6.2 | 0.0 | 12.9 | 381.9 |
| 1B | 56.7 | 1090.6 | 54.6 | 34.7 | 6.9 | 0.0 | 13.2 | 418.6 |
| 1C | 56.7 | 1090.2 | 54.3 | 34.7 | 6.9 | 0.0 | 12.7 | 419.2 |
| 1D | 71.8 | 1371.8 | 68.5 | 48.0 | 9.6 | 0.0 | 10.5 | 648.3 |
| 1E | 57.0 | 1089.8 | 54.5 | 20.8 | 21.2 | 0.0 | 13.0 | 419.0 |
| 1F | 56.7 | 1090.5 | 54.2 | 12.5 | 14.6 | 14.6 | 12.8 | 419.3 |
| 1G | 52.8 | 1015.2 | 50.8 | 15.1 | 17.7 | 17.6 | 15.7 | 522.1 |
| 1H | 31.2 | 1040.2 | 52.3 | 36.0 | 7.3 | 0.0 | 8.0 | 495.0 |
| 1I | 43.6 | 1450.8 | 0.0 | 48.0 | 9.6 | 0.0 | 19.8 | 660.0 |

*PPG DMA refers to poly(propylene glycol) dimethacrylate with an average molecular weight of 560. PPE DMA refers to poly(ethylene glycol) dimethacrylate with an average of molecular weight of 570.

TABLE 2

Particle size and compositions of materials 1A to 1I.

| | Particle size, μm | | | | BET (N$_2$) | | Primer (wt. %) | Core crosslinking (wt %) | Primer crosslinking (wt %) |
|---|---|---|---|---|---|---|---|---|---|
| Example | d$_{v50}$ | d$_{n50}$ | d$_{v50}$/d$_{n50}$ | d$_{v90}$/d$_{v10}$ | SSA, m$^2$/g | SPV, ml/g | | | |
| 1A | 2.30 | 2.28 | 1.01 | 1.17 | 4.136 | 0.015 | 26.0 | 38.5 | 19.9 |
| 1B | 2.10 | 2.08 | 1.01 | 1.15 | 5.205 | 0.018 | 36.1 | 54.5 | 19.9 |
| 1C | 2.18 | 2.15 | 1.01 | 1.28 | 5.608 | 0.019 | 33.0 | 69.1 | 19.9 |
| 1D | 2.39 | 2.37 | 1.01 | 1.15 | 4.956 | 0.017 | 33.6 | 69.3 | 20.0 |
| 1E | 2.22 | 2.19 | 1.01 | 1.25 | 6.470 | 0.021 | 35.7 | 69.2 | 101.9 |
| 1F | 2.18 | 2.11 | 1.03 | 2.38 | 5.543 | 0.020 | 34.3 | 69.2 | 233.6 |
| 1G | 2.40 | 2.32 | 1.04 | 1.36 | 4.892 | 0.019 | 39.6 | 69.2 | 233.8 |
| 1H | 2.17 | 1.98 | 1.09 | 1.93 | 5.381 | 0.017 | 33.0 | 69.0 | 20.0 |
| 1I | 2.46 | 2.35 | 1.05 | 1.28 | 4.729 | 0.017 | 33.0 | 69.0 | 20.0 |

Example 2

Examples 2A to example 2H describe the synthesis of polymer particles with different percentage of crosslinker either in core or primer layer.

Step one: in a typical particle synthesis process (example 2E), 1405.1 grams of reagent alcohol (90% ethanol, ~5% methanol and ~5% isopropanol), 42.3 grams of polyvinylpyrrolidone (PVP-40, average molecular weight 40,000), 4.8 g of 2,2'-Azobis(2-methylpropionitrile) (AIBN), 5.8 g of Triton™ N-57, 76.8 g of styrene and 2.3 g of glycidyl methacrylate were charged into a reactor. After purging with nitrogen, the reaction mixture was heated to 70° C. with stirring and was held at 70° C. until the completion of all the reaction steps.

Step two: after the step one reaction mixture was held at 70° C. for 3 hours, a solution containing 115.3 g of divinylbenzene (DVB 80), 45.7 g of PVP-40, 603.0 g of reagent alcohol (90% ethanol, ~5% methanol and ~5% isopropanol) and 100.0 g of p-xylene was added to the reaction mixture at a constant flow rate over two hours.

Step three: after the completion of solution charge in step two, a primer coating solution containing 43.4 g of glycidyl methacrylate (GMA), 8.6 g of ethylene glycol dimethacrylate (EDMA), 36.5 g of PVP-40 and 560.0 g of reagent alcohol (90% ethanol, ~5% methanol and ~5% isopropanol) was added to the reaction mixture at a constant flow rate over about 1.5 hours.

After the reaction mixture was held at 70° C. for a total of 20 hours, the particles were separated from the reaction slurry by filtration. The particles were then washed with methanol, followed by tetrahydrofuran (THF), and followed by acetone.

The final product was dried in vacuum oven at 45° C. overnight. 166.3 g of monodisperse 2.9 μm polymer particles were obtained.

Reaction data is listed in Table 3.

Analytical date of material 2A to material 2H is listed in Table 4. The percentage of poly(GMA/EDMA) primer in the particle was determined by FTIR as described in the characterization section.

nitrogen, the reaction mixture was heated to 70° C. with stirring and was held at 70° C. until the completion of all the reaction steps.

Step two: after the step one reaction mixture was held at 70° C. for 3 hours, a solution containing 72.1 g of divinylbenzene (DVB 80), 21.5 g of PVP360 (PVP360, average molecular weight 360,000), 1350 g of reagent alcohol (90% ethanol, ~5% methanol and ~5% isopropanol) and 67.5 g of p-xylene was continuously added to the reaction mixture at a constant flow rate over about 2 hours.

Step three: after the completion of solution charge in step two, a hydrophilic primer coating solution containing 36.2 g of glycidyl methacrylate (GMA), 7.44 g of ethylene glycol dimthacrylate (EDMA), 8.21 g of PVP360(PVP360, average molecular weight 360,000) and 489.4 g of reagent alcohol

TABLE 3

Formulation of materials 2A to 2H.

| | Necleation solution, g | | | | | | Crosslinking solution, g | | | | | Primer coating solution, g | | | |
|---|---|---|---|---|---|---|---|---|---|---|---|---|---|---|---|
| Example | Styrene | GMA | AIBN | PVP-40 | Triton™ N-57 | Reagent alcohol | DVB80 | Styrene | PVP-40 | Reagent alcohol | p-Xylene | GMA | EDMA | PVP-40 | Reagent alcohol |
| 2A | 87.3 | 2.6 | 4.8 | 47.9 | 5.9 | 1597.0 | 104.9 | 0.0 | 33.7 | 418.1 | 100.0 | 26.4 | 25.9 | 36.6 | 560.1 |
| 2B | 68.5 | 2.1 | 4.8 | 55.5 | 5.8 | 1233.0 | 104.8 | 18.8 | 55.4 | 752.0 | 100.0 | 43.2 | 8.6 | 37.5 | 562.9 |
| 2C | 81.7 | 2.5 | 4.8 | 45.1 | 5.9 | 1500.0 | 110.4 | 0.0 | 39.7 | 510 | 100.2 | 26.0 | 26.0 | 36.4 | 560.0 |
| 2D | 76.8 | 2.3 | 4.8 | 42.2 | 5.8 | 1405.5 | 115.3 | 0.0 | 45.8 | 603.1 | 100.0 | 25.9 | 25.9 | 36.4 | 560.4 |
| 2E | 76.8 | 2.3 | 4.8 | 42.3 | 5.8 | 1405.1 | 115.3 | 0.0 | 45.7 | 603.0 | 100.0 | 43.4 | 8.6 | 36.5 | 560.0 |
| 2F | 68.5 | 2.1 | 4.8 | 39.8 | 5.8 | 1590.0 | 115.2 | 8.3 | 36.8 | 426.0 | 100.3 | 43.2 | 8.6 | 38.5 | 550.0 |
| 2G | 68.5 | 2.1 | 4.8 | 55.5 | 5.8 | 1233.4 | 123.4 | 0.0 | 55.8 | 752.7 | 106.5 | 43.2 | 8.6 | 36.9 | 561.2 |
| 2H | 64.0 | 1.9 | 4.8 | 35.7 | 5.8 | 1488.0 | 128.1 | 0.0 | 50.1 | 522.0 | 101.9 | 43.2 | 8.6 | 36.1 | 551.4 |

TABLE 4

Particle size and composition of materials 2A to 2H.

| | Particle size, μm | | | | BET ($N_2$) | | | Core crosslinking (wt %) | Primer crosslinking (wt %) |
|---|---|---|---|---|---|---|---|---|---|
| Example | $d_{v50}$ | $d_{n50}$ | $d_{v50}/d_{n50}$ | $d_{v90}/d_{v10}$ | SSA, $m^2/g$ | SPV, ml/g | C % (wt) | | |
| 2A | 2.62 | 2.56 | 1.02 | 1.32 | 2.987 | 0.010 | 83.45 | 75.7 | 98.1 |
| 2B | 3.46 | 2.24 | 1.54 | 1.46 | / | / | / | 76.0 | 19.0 |
| 2C | 3.55 | 3.28 | 1.08 | 1.45 | 2.629 | 0.008 | 83.75 | 83.1 | 100 |
| 2D | 3.07 | 2.97 | 1.03 | 1.32 | 3.097 | 0.010 | 84.09 | 90.2 | 100 |
| 2E | 2.86 | 2.83 | 1.01 | 1.20 | 2.895 | 0.009 | 83.46 | 90.3 | 19.8 |
| 2F | / | / | / | / | / | / | / | 90.4 | 19.9 |
| 2G | 2.69 | 2.67 | 1.01 | 1.15 | / | / | / | 103.6 | 19.9 |
| 2H | / | / | / | / | / | / | / | 111.9 | 19.9 |

Example 3

Particles with different particle size can be synthesized by varying the parameters in the formulation, such as stabilizer concentration. Material 3A to material 3F describe the synthesis of polymer particles with different particle size by varying the concentration of stabilizer and co-stabilizer, such as PVP-40/Triton N-57 and PVP360/Triton N-57 in the nucleation step.

Step one: in a typical particle synthesis process (example 3F), 205.4 g of 200 proof ethanol, 3.4 g of polyvinylpyrrolidone (PVP360, average molecular weight 360,000), 1.35 g of Triton™ N-57, 3.81 g of 2,2'-Azobis(2-methylpropionitrile) (AIBN), 72.1 g of styrene and 2.1 g of Poly (propylene glycol) dimethacrylate (average molecular weight 560) were charged into a reactor. After purging with (90% ethanol, ~5% methanol and ~5% isopropanol) was added into the reaction mixture at a constant flow rate over about 1.5 hours.

After the reaction mixture was held at 70° C. for a total of 20 hours, the particles were separated from the reaction slurry by filtration. The particles were then washed with methanol, followed by tetrahydrofuran (THF), and followed by acetone.

The final product was dried in vacuum oven at 45° C. overnight. 55.2 g of monodisperse 4.5 μm polymer particles were obtained.

Reaction data is listed in Table 5.

Analytical date of materials 3A to 3F is listed in Table 6. The percentage of poly(GMA/EDMA) primer in the particle was determined by FTIR as described in the characterization section.

TABLE 5

Formulation of materials 3A to 3F.

| Example | Nucleation solution, g | | | | | | Crosslinking solution, g | |
|---|---|---|---|---|---|---|---|---|
| | Styrene | PPG DMA | AIBN | PVP-40 or PVP360 | Triton™ N-57 | Reagent alcohol | DVB80 | PVP-40 |
| 3A | 92.1 | 2.8 | 1.8 | 19.4 | 15.3 | 636.0 | 92.5 | 72.2 |
| 3B | 96.1 | 2.9 | 1.9 | 26.1 | 20.9 | 652.0 | 96.1 | 43.5 |
| 3C | 96.1 | 2.9 | 1.9 | 13.5 | 10.9 | 675.5 | 96.2 | 43.7 |
| 3D | 72.1 | 2.2 | 3.8 | 5.1 | 2.0 | 315.1 | 72.1 | 19.8 |
| 3E | 71.6 | 2.1 | 3.8 | 3.9 | 1.6 | 249.0 | 71.8 | 65.1 |
| 3F | 72.1 | 2.2 | 3.8 | 3.4 | 1.4 | 205.4 | 72.1 | 21.6 |

| Example | Crosslinking solution, g | | Primer coating solution, g | | | | |
|---|---|---|---|---|---|---|---|
| | Reagent alcohol | p-Xylene | GMA | EDMA | PEG DMA | PVP-40 | Reagent alcohol |
| 3A | 1275.8 | 96 | 41.4 | 8.3 | 0.0 | 17.0 | 565.0 |
| 3B | 1449.8 | 0.0 | 48.1 | 9.6 | 0.0 | 19.9 | 655.8 |
| 3C | 1450.0 | 0.0 | 48.0 | 9.7 | 0.0 | 19.7 | 655.4 |
| 3D | 1240.4 | 0.0 | 36.0 | 7.2 | 0.0 | 7.9 | 496.0 |
| 3E | 1250.0 | 62.6 | 15.3 | 17.5 | 17.6 | 15.5 | 520.6 |
| 3F | 1350.1 | 67.5 | 36.2 | 7.4 | 0.0 | 8.2 | 489.4 |

*PPG DMA refers to poly(propylene glycol) dimethacrylate with an average molecular weight of 560. PPE DMA refers to poly(ethylene glycol) dimethacrylate with an average of molecular weight of 570.

TABLE 6

Particle size and composition of materials 3A to 3F.

| Example | Particle size, μm | | | | BET ($N_2$) | | Primer (wt. %) | Core crosslinking (wt %) | Primer crosslinking (wt. %) |
|---|---|---|---|---|---|---|---|---|---|
| | $d_{v50}$ | $d_{n50}$ | $d_{v50}/d_{n50}$ | $d_{v90}/d_{v10}$ | SSA, $m^2/g$ | SPV, ml/g | | | |
| 3A | 2.18 | 2.14 | 1.02 | 1.33 | 5.962 | 0.017 | 31.3 | 69.5 | 20.0 |
| 3B | 2.51 | 2.46 | 1.02 | 1.18 | 4.727 | 0.015 | 29.5 | 69.2 | 20.0 |
| 3C | 3.11 | 2.96 | 1.05 | 1.53 | 3.996 | 0.013 | 34.3 | 69.2 | 20.2 |
| 3D | 2.07 | 2.05 | 1.01 | 1.22 | 4.205 | 0.013 | 11.9 | 69.2 | 20.0 |
| 3E | 3.36 | 3.32 | 1.02 | 1.21 | 2.717 | 0.009 | 10.7 | 69.2 | 229.8 |
| 3F | 4.47 | 4.38 | 1.02 | 1.28 | 2.733 | 0.014 | 7.4 | 69.2 | 205.6 |

Example 4

In material 4A to material 4D, N-tris(hydroxymethyl) methyl acrylamide) (Tris) and N,N'-methylenebisacrylamide (Bis)) were used as primer monomers.

Step one: in a typical particle synthesis process (example 4C), 229.5 g of reagent alcohol (90% ethanol, ~5% methanol and ~5% isopropanol), 6.22 g of polyvinylpyrrolidone (PVP-40, average molecular weight 40,000), 1.56 g of 2,2'-Azobis(2-methylpropionitrile) (AIBN), 1.76 g of Triton™ N-57 and 80.1 g of styrene were charged into a reactor. After purging with nitrogen, the reaction mixture was heated to 70° C. with stirring and was held at 70° C. until the completion of all the reaction steps.

Step two: after the step one reaction mixture was held at 70° C. for 3 hours, a solution containing 52.1 g of divinylbenzene (DVB 80), 24.0 g of styrene, 91.9 g of PVP-40, 25.7 g of Triton™ N-57, 1850.9 g of reagent alcohol (90% ethanol, ~5% methanol and ~5% isopropanol) and 227.4 g of p-xylene was continuously added to the reaction mixture at a constant flow rate for about two hours.

Step three: after the completion of solution charge in step two, a hydrophilic primer coating solution containing 31.2 g of N-tris(hydroxymethyl)methyl) acrylamide (Tris), 6.2 g of N,N'-methylenebisacrylamide (Bis), 17.4 g of PVP-40, 290.2 g of reagent alcohol (90% ethanol, ~5% methanol and ~5% isopropanol) and 290.1 g of water was added into the reaction mixture at a constant flow rate over about 100 minutes.

After the reaction mixture was held at 70° C. for a total of 20 hours, the particles were separated from the reaction slurry by filtration. The particles were then washed with methanol, followed by tetrahydrofuran (THF), and followed by acetone.

The final product was dried in vacuum oven at 45° C. overnight. 36.4 g of monodisperse 4.7 μm polymer particles were obtained.

Reaction data is listed in Table 7.

Analytical data for of materials 4A to 4C are listed in Table 8. The percentage of primer in the final materials was calculated by N % found in the sample by elemental analysis.

TABLE 7

Formulation of materials 4A to 4D.

| | Nucleation solution, g | | | | | Crosslinking solution, g | | | | | Primer coating solution, g | | | | |
|---|---|---|---|---|---|---|---|---|---|---|---|---|---|---|---|
| Example | Styrene | AIBN | PVP-40 | Triton™ N-57 | Reagent alcohol | DVB80 | Styrene | PVP-40 | Reagent alcohol | p-Xylene | Tris | Bis | PVP-40 | Water | Reagent alcohol |
| 4A | 60.1 | 1.2 | 7.9 | 2.2 | 262.0 | 39.1 | 18.0 | 59.1 | 1280.2 | 192.3 | 23.5 | 4.8 | 13.7 | 220.2 | 220.7 |
| 4B | 80.0 | 1.6 | 6.2 | 1.8 | 310.5 | 52.0 | 24.0 | 88.7 | 1780.9 | 222.5 | 31.2 | 6.2 | 17.5 | 290.5 | 292.4 |
| 4C | 80.1 | 1.6 | 6.2 | 1.8 | 229.5 | 52.1 | 24.0 | 91.9 | 1850.9 | 227.4 | 31.2 | 6.2 | 17.4 | 290.1 | 290.5 |
| 4D | 60.0 | 1.6 | 10.2 | 2.9 | 349.5 | 52.2 | 24.0 | 76.6 | 1550.4 | 232.9 | 31.2 | 6.2 | 15.6 | 260.1 | 260.2 |

TABLE 8

Particle size and composition of materials 4A to 4D.

| | Particle size, µm | | | | BET ($N_2$) | | Primer | | Core crosslinking (wt. %) | Primer crosslinking (wt %) |
|---|---|---|---|---|---|---|---|---|---|---|
| Example | $d_{v50}$ | $d_{n50}$ | $d_{v50}/d_{n50}$ | $d_{v90}/d_{v10}$ | SSA, $m^2/g$ | SPV, ml/g | N % | Primer (wt. %) | | |
| 4A | 1.77 | 1.75 | 1.01 | 1.22 | 7.738 | 0.022 | 0.60 | 8.6 | 36.4 | 20.4 |
| 4B | 2.96 | 2.91 | 1.01 | 1.22 | 6.081 | 0.017 | 0.46 | 5.7 | 36.4 | 19.9 |
| 4C | 4.63 | 4.54 | 1.02 | 1.17 | 3.928 | 0.013 | 0.42 | 5.0 | 36.4 | 19.9 |
| 4D | 2.03 | 2.01 | 1.02 | 1.19 | 7.063 | 0.022 | 0.72 | 10.9 | 36.4 | 19.9 |

Example 5

In example 5, 2-hydroxyethyl acrylamide (HEAM) and N,N'-methylenebisacryalmide (Bis)) were used as primer monomers and poly(GMA/EDMA) as core.

Step one: in a typical particle synthesis process (example 5A), 970.0 g of reagent alcohol (90% ethanol, ~5% methanol and ~5% isopropanol), 29.1 g of polyvinylpyrrolidone (PVP-40, average molecular weight 40,000), 2.2 g of 2,2'-Azobis(2-methylpropionitrile) (AIBN) and 108 g of glycidyl methacrylate were charged into a reactor. After purging with nitrogen, the reaction mixture was heated to 70° C. with stirring and was held at 70° C. until the completion of all the reaction steps.

Step two: after the step one reaction mixture was held at 70° C. for about 70 minutes, a solution containing 108.1 g of ethylene glycol dimethacrylate (EDMA), 45.4 g of PVP-40 and 763.0 g of reagent alcohol (90% ethanol, ~5% methanol and ~5% isopropanol) was added to the reaction mixture at a constant flow rate over about 140 minutes.

Step three: after the completion of solution charge in step two, a hydrophilic primer coating solution containing 13.0 g of 2-hydroxyethyl acrylamide (HEAM), 2.6 g of N,N'-methylenebisacrylamide (Bis), 4.5 g of PVP-40 and 148.0 g of reagent alcohol (90% ethanol, ~5% methanol and ~5% isopropanol) was added into the reaction mixture at a constant flow rate over about 30 minutes.

After the reaction mixture was held at 70° C. for a total of 20 hours, the particles were separated from the reaction slurry by filtration. The particles were then washed with methanol, followed by tetrahydrofuran (THF), and followed by acetone.

The final product was dried in vacuum oven at 45° C. overnight. 219.7 g of monodisperse 1.75 µm polymer particles were obtained.

Reaction data is listed in Table 9.

Analytical date of material 5A to material 5C is listed in Table 10. The percentage of primer in the final materials was calculated by N % found in the sample by elemental analysis.

TABLE 9

Formulation of materials 5A to 5C.

| | Nucleation solution, g | | | | | Crosslinking solution, g | | | Primer coating solution, g | | | |
|---|---|---|---|---|---|---|---|---|---|---|---|---|
| Example | GMA | EDMA | AIBN | PVP-40 | Reagent alcohol | EDMA | PVP-40 | Reagent alcohol | HEAM | Bis | PVP-40 | Reagent alcohol |
| 5A | 108.0 | 0.00 | 2.18 | 29.1 | 970.0 | 108.1 | 45.3 | 763.0 | 13.0 | 2.6 | 4.5 | 148.0 |
| 5B | 36.0 | 0.18 | 0.72 | 9.7 | 323.0 | 36.0 | 15.1 | 254.0 | 4.3 | 0.9 | 1.3 | 38.5 |
| 5C | 36.0 | 0.54 | 0.73 | 9.7 | 323.0 | 36.1 | 15.1 | 254.0 | 4.3 | 0.9 | 1.2 | 38.5 |

TABLE 10

Particle size and composition of materials 5A to 5C.

| Example | Particle size, μm | | | | BET (N$_2$) | | Primer | | Core crosslinking (wt %) | Primer crosslinking (wt %) |
| --- | --- | --- | --- | --- | --- | --- | --- | --- | --- | --- |
| | d$_{v50}$ | d$_{n50}$ | d$_{v50}$/d$_{n50}$ | d$_{v90}$/d$_{v10}$ | SSA, m$^2$/g | SPV, ml/g | N % | primer (wt. %) | | |
| 5A | 1.75 | 1.73 | 1.01 | 1.16 | 4.547 | 0.015 | 0.54 | 5.3 | 100.1 | 20.0 |
| 5B | 1.96 | 1.95 | 1.01 | 1.16 | 3.933 | 0.013 | 0.51 | 4.8 | 100.5 | 20.0 |
| 5C | 1.99 | 1.98 | 1.00 | 1.16 | 3.908 | 0.013 | 0.46 | 4.1 | 101.8 | 20.0 |

Example 6

Example 6 describes the control of particle size of poly (GMA/EDMA) particles with poly(Tris/Bis) primer. The parameter used in the examples for varying particle size is the monomer (glycidyl methacrylate) concentration in the nucleation step. The crosslinker percentage in the nucleation step for all examples is 3% based on the weight of glycidyl methacrylate.

Step one: in a typical particle synthesis process (example 6D), 115.2 g of reagent alcohol (90% ethanol, ~5% methanol and ~5% isopropanol), 6.1 g of toluene, 1.2 g of polyvinylpyrrolidone (PVP-40, average molecular weight 40,000), 0.8 g of 2,2'-Azobis(2-methylpropionitrile) (AIBN) and 27.0 g of glycidyl methacrylate were charged into a reactor. After purging with nitrogen, the reaction mixture was heated to 70° C. and was held at 70° C. until the completion of all the reaction steps.

Step two: after the step one reaction mixture was held at 70° C. for about 1 hour, a solution containing 38.6 g of ethylene glycol dimethacrylate (EDMA), 11.6 g of glycidyl methacrylate (GMA) 22.6 g of PVP-40, 412.1 g of reagent alcohol (90% ethanol, ~5% methanol and ~5% isopropanol) and 21.6 g of toluene was added to the reaction mixture at a constant flow rate over about 3 hours.

Step three: after the completion of solution charge in step two, a hydrophilic primer coating solution containing 12.0 g of N-[tris(hydroxymethyl)methyl] acrylamide (Tris), 2.3 g of N,N'-methylenebisacrylamide (Bis), 3.7 g of PVP-40, 61.6 g of reagent alcohol (90% ethanol, ~5% methanol and ~5% isopropanol) and 62.1 g of water was added into the reaction mixture at a constant flow rate over about 30 minutes.

After the reaction mixture was held at 70° C. for a total of 20 hours, the particles were separated from the reaction slurry by filtration. The particles were then washed with methanol, followed by tetrahydrofuran (THF), and followed by acetone.

The final product was dried in vacuum oven at 45° C. overnight. 71.7 g of monodisperse 5.5 μm particles were obtained.

Reaction data is listed in Table 11.

Analytical date of material 6A to material 6J is listed in Table 12. The percentage of primer in the final materials was calculated by N % found in the sample by elemental analysis.

TABLE 11

Formulation of materials 6A to 6J.

| | Necleation solution, g | | | | | | Crosslinking solution, g | | | | | Primer coating solution, g | | | | |
| --- | --- | --- | --- | --- | --- | --- | --- | --- | --- | --- | --- | --- | --- | --- | --- | --- |
| Example | GMA | EDMA | AIBN | PVP-40 | Reagent alcohol | Toluene | EDMA | GMA | PVP-40 | Reagent alcohol | Tolene | Tris | Bis | PVP-40 | Reagent alcohol | Water |
| 6A | 81.1 | 0.0 | 2.3 | 30.9 | 1175.0 | 61.8 | 115.7 | 34.8 | 40.1 | 403.0 | 21.2 | 23.1 | 4.6 | 7.5 | 123.0 | 123.0 |
| 6B | 84.0 | 0.0 | 2.4 | 9.5 | 906.2 | 47.7 | 120.0 | 36.0 | 63.6 | 730.0 | 38.4 | 24.1 | 4.8 | 7.6 | 127.0 | 127.0 |
| 6C | 27.1 | 0.0 | 0.8 | 1.4 | 132.4 | 7.0 | 38.6 | 11.7 | 22.8 | 393.8 | 20.8 | 11.7 | 2.3 | 3.7 | 61.2 | 61.5 |
| 6D | 27.0 | 0.0 | 0.8 | 1.2 | 115.2 | 6.1 | 38.6 | 11.6 | 22.6 | 412.1 | 21.6 | 12.0 | 2.3 | 3.7 | 61.6 | 62.1 |
| 6E | 27.1 | 0.0 | 0.8 | 2.1 | 211.3 | 0.0 | 38.6 | 11.6 | 21.9 | 340.2 | 0.0 | 11.6 | 2.3 | 3.8 | 62.0 | 61.5 |
| 6F | 27.0 | 0.0 | 0.8 | 3.6 | 118.6 | 0.0 | 38.6 | 11.7 | 20.9 | 432.5 | 0.0 | 11.8 | 2.3 | 3.7 | 61.2 | 61.5 |
| 6G | 27.0 | 0.0 | 0.8 | 1.2 | 118.7 | 0.0 | 38.6 | 11.6 | 22.5 | 432.8 | 0.0 | 11.8 | 2.3 | 3.7 | 61.2 | 61.5 |
| 6H | 76.0 | 1.16 | 1.53 | 20.5 | 682.1 | 0.0 | 76.0 | 0.0 | 30.8 | 536.2 | 0.0 | 9.2 | 1.8 | 3.7 | 50.0 | 50.0 |
| 6I | 38.0 | 0.58 | 0.77 | 6.9 | 343.6 | 0.0 | 38.0 | 0.0 | 19.0 | 265.0 | 0.0 | 4.6 | 0.9 | 2.1 | 33.0 | 33.0 |
| 6J | 38.0 | 0.58 | 0.76 | 3.5 | 344.1 | 0.0 | 38.0 | 0.0 | 22.5 | 265.0 | 0.0 | 4.6 | 0.9 | 2.2 | 33.0 | 33.0 |

TABLE 12

Particle size and compositions of materials 6A to 6J.

| Example | Particle size | | | | BET (N$_2$) | | Primer | | Core crosslinking (wt %) | Primer crosslinking (wt %) |
| --- | --- | --- | --- | --- | --- | --- | --- | --- | --- | --- |
| | d$_{v50}$ μm | d$_{n50}$ μm | d$_{v50}$/d$_{n50}$ | d$_{v90}$/d$_{v10}$ | SSA, m$^2$/g | SPV, ml/g | N % | primer (wt. %) | | |
| 6A | 1.80 | 1.78 | 1.01 | 1.25 | 4.406 | 0.016 | 0.61 | 8.8 | 99.8 | 19.9 |
| 6B | 2.73 | 2.66 | 1.03 | 1.41 | 3.568 | 0.014 | 0.58 | 8.2 | 100.0 | 19.9 |
| 6C | 4.40 | 4.31 | 1.02 | 1.35 | 3.034 | 0.014 | 0.69 | 10.3 | 99.5 | 19.7 |
| 6D | 5.46 | 5.33 | 1.03 | 1.37 | 2.407 | 0.011 | 0.76 | 11.7 | 100.0 | 19.2 |

TABLE 12-continued

Particle size and compositions of materials 6A to 6J.

| | Particle size | | | | BET (N$_2$) | | Primer | Core crosslinking | Primer crosslinking |
| --- | --- | --- | --- | --- | --- | --- | --- | --- | --- |
| Example | d$_{v50}$ μm | d$_{n50}$ μm | d$_{v50}$/d$_{n50}$ | d$_{v90}$/d$_{v10}$ | SSA, m$^2$/g | SPV, ml/g | primer N % | (wt. %) | (wt %) | (wt %) |
| 6E | 3.24 | 3.11 | 1.04 | 1.52 | 3.727 | 0.014 | 0.71 | 10.7 | 99.7 | 19.8 |
| 6F | 2.94 | 2.83 | 1.04 | 1.36 | 4.885 | 0.017 | 0.58 | 8.2 | 99.7 | 19.5 |
| 6G | 4.71 | 4.45 | 1.06 | 1.48 | 2.750 | 0.012 | 0.68 | 10.1 | 100.0 | 19.5 |
| 6H | 1.85 | 1.83 | 1.01 | 1.15 | 4.026 | 0.013 | 0.40 | 4.6 | 101.5 | 19.8 |
| 6I | 2.62 | 2.59 | 1.01 | 1.18 | 3.240 | 0.010 | 0.35 | 3.6 | 101.5 | 19.6 |
| 6J | 2.95 | 2.91 | 1.01 | 1.26 | 2.837 | 0.010 | 0.43 | 5.2 | 101.5 | 19.8 |

Example 7

Different surface morphologies as shown in FIG. 2 are controlled by both agitation and formulation.

Step one: in a typical process to prepare particles with different morphology (example 7A), 1175.0 grams of reagent alcohol (90% ethanol, ~5% methanol and ~5% isopropanol), 61.9 grams of toluene, 30.9 grams of polyvinylpyrrolidone (PVP-40, average molecular weight 40,000), 2.3 grams of 2,2'-Azobis(2-methylpropionitrile) (AIBN) and 81.0 grams of glycidyl methacrylate were charged into a reactor. After purging with nitrogen, the reaction mixture was heated to 70° C. and was held at 70° C. until the completion of all the reaction steps.

Step two: after the step one reaction mixture was held at 70° C. for about 60 minutes, a solution containing 115.8 grams of ethylene glycol dimethacrylate (EDMA), 34.8 grams of glycidyl methacrylate (GMA), 40.8 grams of PVP-40, 403.2 grams of reagent alcohol (90% ethanol, ~5% methanol and ~5% isopropanol) and 21.2 grams of toluene was added to the reaction mixture at a constant flow rate over about 2.5 hours.

Step three: after the completion of solution charge in step two, a hydrophilic primer coating solution containing 34.8 grams of N-[tris(hydroxymethyl)methyl] acrylamide (Tris), 6.9 grams of N,N'-methylenebisacrylamide (Bis), 11.2 g of PVP-40, 184 grams of reagent alcohol (90% ethanol, ~5% methanol and ~5% isopropanol) and 184 grams of water was added into the reaction mixture at a constant flow rate over about 25 minutes.

After the reaction mixture was held at 70° C. for a total of 20 hours, the particles were separated from the reaction slurry by filtration. The particles were then washed with methanol, followed by tetrahydrofuran (THF), and followed by acetone.

Reaction data is listed in Table 13.

Analytical date of material 7A to material 7I is listed in Table 14. The percentage of poly(Tis/Bis) primer in the final materials was calculated by N % found in the sample by elemental analysis. The percentage of poly(GMA/EDMA) primer in the final materials was determined by FTIR.

TABLE 13

Formulation for materials 7A to material 7I.

| | Necleation solution, g | | | | | | | Crosslinking solution, g | | | | |
| --- | --- | --- | --- | --- | --- | --- | --- | --- | --- | --- | --- | --- |
| Example | Styrene | GMA | PPG DMA | AIBN | PVP-40 | Reagent alcohol | Triton N-57 | DVB80 | Styrene | EDMA | GMA | PVP-40 |
| 7A | 0 | 81.0 | 0 | 2.3 | 30.9 | 1175.0 | 61.9 | 0.0 | 0.0 | 115.8 | 34.8 | 40.8 |
| 7B | 0 | 30.5 | 0 | 0.9 | 1.6 | 154.5 | 0.0 | 0.0 | 0.0 | 47.4 | 13.2 | 15.0 |
| 7C | 70.1 | 0.0 | 2.11 | 1.4 | 9.6 | 303.8 | 2.6 | 45.5 | 21.1 | 0.0 | 0.0 | 68.5 |
| 7D | 69.1 | 0.0 | 2.11 | 1.3 | 9.0 | 299.5 | 2.5 | 45.0 | 21.1 | 0.0 | 0.0 | 62.6 |
| 7E | 514.0 | 0.0 | 15.5 | 10.3 | 107.8 | 3596.8 | 86.2 | 514.5 | 0.0 | 0.0 | 0.0 | 222.8 |
| 7F | 92.2 | 0.0 | 2.9 | 1.8 | 40.6 | 1116.0 | 33.4 | 92.1 | 0.0 | 0.0 | 0.0 | 46.8 |
| 7G | 504.5 | 0.0 | 15.7 | 10.1 | 106.6 | 3525.7 | 84.8 | 499.6 | 0.0 | 0.0 | 0.0 | 219.8 |
| 7H | 87.3 | 2.6 | 0.0 | 4.8 | 47.9 | 1597.0 | 5.9 | 104.9 | 0.0 | 0.0 | 0.0 | 33.7 |
| 7I | 76.8 | 2.3 | 0.0 | 4.8 | 42.3 | 1405.1 | 5.8 | 115.3 | 0.0 | 0.0 | 0.0 | 45.7 |

| | Crosslinking solution, g | | | Primer coating solution, g | | | | | | |
| --- | --- | --- | --- | --- | --- | --- | --- | --- | --- | --- |
| Example | Triton N-57 | Reagent alcohol | p-xylene | Tris | Bis | GMA | EDMA | PVP-40 | Reagent alcohol | Water |
| 7A | 0.0 | 403.2 | 21.2 | 34.8 | 6.9 | 0.0 | 0.0 | 11.2 | 184.2 | 184.0 |
| 7B | 0.0 | 429.0 | 0.0 | 9.3 | 1.8 | 0.0 | 0.0 | 1.3 | 43.5 | 50.2 |
| 7C | 17.6 | 133.5 | 66.8 | 27.3 | 5.5 | 0.0 | 0.0 | 13.6 | 225.9 | 222.4 |
| 7D | 18.3 | 1390.0 | 0.0 | 26.9 | 5.4 | 0.0 | 0.0 | 12.7 | 210.0 | 210.0 |
| 7E | 0.0 | 7427.5 | 373.6 | 0.0 | 0.0 | 258.3 | 51.8 | 56.4 | 3527.9 | 0.0 |
| 7F | 0.0 | 980.0 | 0.0 | 0.0 | 0.0 | 41.9 | 8.3 | 16.5 | 548.3 | 0.0 |
| 7G | 0.0 | 7280.9 | 364.1 | 0.0 | 0.0 | 252.0 | 51.0 | 55.3 | 3460.0 | 0.0 |
| 7H | 0.0 | 418.1 | 100.0 | 0.0 | 0.0 | 26.4 | 25.9 | 36.6 | 560.1 | 0.0 |
| 7I | 0.0 | 603.0 | 100.0 | 0.0 | 0.0 | 43.4 | 8.6 | 36.5 | 560.0 | 0.0 |

TABLE 14

Particle size and compositions of materials 7A to 7I

| Example | Particle size | | | | BET (N₂) | | Primer quantification | | Core crosslinking (wt. %) | Primer crosslinking (wt. %) |
|---|---|---|---|---|---|---|---|---|---|---|
| | $d_{v50}$ μm | $d_{n50}$ μm | $d_{v50}/d_{n50}$ | $d_{v90}/d_{v10}$ | SSA, m²/g | SPV, ml/g | N % | primer % (wt) | | |
| 7A | 2.13 | 2.10 | 1.01 | 1.33 | 4.696 | 0.020 | 0.50 | 6.6 | 100.0 | 19.8 |
| 7B | 5.65 | 4.80 | 1.18 | 1.90 | 1.590 | 0.006 | 0.52 | 7.0 | 108.5 | 19.4 |
| 7C | 2.53 | 2.45 | 1.03 | 1.35 | 5.186 | 0.017 | 0.63 | 9.2 | 38.4 | 20.1 |
| 7D | 2.35 | 2.32 | 1.01 | 1.25 | 5.542 | 0.019 | 0.70 | 10.5 | 38.4 | 20.1 |
| 7E | 2.41 | 2.28 | 1.06 | 1.39 | 4.558 | 0.015 | / | / | 69.2 | 20.0 |
| 7F | 2.33 | 2.16 | 1.07 | 1.36 | 4.859 | 0.017 | / | 45.7 | 69.2 | 19.8 |
| 7G | 2.79 | 2.71 | 1.07 | 1.35 | / | / | / | / | 69.2 | 20.0 |
| 7H | 2.62 | 2.56 | 1.07 | 1.32 | 2.987 | 0.010 | / | / | 75.7 | 98.1 |
| 7I | 2.86 | 2.82 | 1.01 | 1.09 | 2.895 | 0.009 | / | / | 90.2 | 20.0 |

Example 8

In a typical hydrophilic coating process in organic solvent (example 8B), 70 grams of polystyrene/DVB particle with an poly(GMA/EDMA) primer were hydrolized in 0.5 M $H_2SO_4$ at 60° C. for 1 to 20 hours. The hydrolyzed particles were thoroughly washed with MilliQ water and then washed with methanol. The particles were dried under vacuum at 45° C. overnight. The dried particles were then added into a 1000 ml three necked round bottom flask equipped with an overhead stirring motor, stirring shaft and stir blade, a water cooled condenser, nitrogen inlet and thermo probe controlled heating mantle. 700 ml of anhydrous diglyme (Diethylene glycol dimethyl ether, Sigma Aldrich, St. Louis MO) was added and the flask sealed and purged with nitrogen for 15 minutes with moderate stirring. After 15 minutes of nitrogen purging 2.0 g potassium tert-butoxide (Acros Organics, New Jersey USA) was added to the stirred solution. The reaction temperature was raised from room temperature to 70° C. A mixture of 10.5 g glycidol (Sigma-Aldrich, St Louis, MO USA), 2.6 g glyceroltriglycidyl ether (Polysciences, Warrington PA) and 14.9 g anhydrous diglyme was prepared in a small beaker and well mixed. The prepared mixture was then added to the stirring particle mixture in four equal aliquots added thirty minutes apart starting with the first addition thirty minutes after the addition of the potassium tert-butoxide.

The reaction mixture was held at 70° C. for 20 hours, cooled to RT, and filtered. The resulting particles were washed with 6× water and 3× methanol and dried under vacuum at 45° C. overnight.

Reaction data and analytical data are listed in Table 15.

TABLE 15

Examples of Hydrophilic Coating of Base Particle

| Example | Base particle (hydrolyzed) | Raw materials charge for hydrophilic coating, g | | | | | Found hydrophilic layer (wt. %) |
|---|---|---|---|---|---|---|---|
| | | Particle g | Glycidol g | GTGE g | t-BuOK g | Diglyme g | |
| 8A | example 1H | 50.0 | 7.4958 | 1.8754 | 1.4026 | 500.0 | 2.2 |
| 8B | example 3D | 70.0 | 10.5022 | 2.6235 | 1.9561 | 700.0 | 2.3 |
| 8C | example 6E | 100.0 | 15.0102 | 3.7713 | 2.8069 | 1000.0 | 1.6 |
| 8D | example 6F | 50.0 | 7.5 | 1.8803 | 1.4035 | 500.0 | 2.6 |
| 8E | Example 7G | 125.0 | 18.7519 | 4.6833 | 3.5051 | 1250.0 | 3.4 |
| 8F | Example 7G | 60.0 | 9.0082 | 2.278 | 1.6848 | 600.0 | 3.2 |
| 8G | Example 7G | 6.0 | 8.9999 | 2.2573 | 1.6832 | 600.0 | 3.6 |
| 8H | Example 7G | 60.0 | 8.9866 | 2.2488 | 106891 | 600.0 | 3.2 |
| 8I | Example 7I | 50.0 | 7.5004 | 1.8791 | 1.4025 | 500.0 | 2.9 |
| 8J | Example 7I | 30.0 | 4.5142 | 1.1269 | 0.8429 | 300.0 | 3.0 |
| 8K | Example 7H | 60.0 | 9.024 | 2.2585 | 1.6873 | 600.0 | 2.2 |
| 8L | Example 2D | 60.0 | 9.0056 | 2.252 | 1.6816 | 600.0 | 1.8 |
| 8M | Example 7I | 60.0 | 9.0131 | 2.2607 | 1.6885 | 600.0 | 2.2 |

Example 9

23.8 grams of polystyrene/DVB particle with an N-tris (hydroxymethyl)methyl acrylamide primer coated surface prepared as described in example 3A were placed into a 200 ml three necked round bottom flask equipped with an overhead stirring motor, stirring shaft and stir blade, a water cooled condenser, nitrogen inlet and thermo probe controlled heating mantle. 87.3 ml of MilliQ water, 15.8 g of 1,4-dioxane, 4.1 g of 50% sodium hydroxide aqueous solution and 9.6 g of glycerol triglycidyl ether were added and the flask was sealed.

The reaction was held at room temperature for 72 hours. After reaction, the particles were separated by filtration and washed to MilliQ water until the conductivity of the slurry is less than 20 μS and then washed 3× methanol and dried under vacuum at 45° C. overnight.

Example 10

45.1 grams of polystyrene/DVB particle with a poly (GMA/EDMA) primer prepared as described in example 1B was placed into a 500 ml three necked round bottom flask equipped with an overhead stirring motor, stirring shaft and stir blade, a water cooled condenser, nitrogen inlet and thermo probe controlled heating mantle. 226.6 grams of diethylene glycol and 6.0 grams of boron trifluoride diethyl etherate were added and the flask was sealed.

The temperature was raised to 80° C. and the reaction was held at 80° C. for 24 hours. After the reaction, the particles were separated by filtration and washed with 3× methanol and then 3× water followed by 3× methanol. The particles were dried under vacuum at 45° C. overnight. 47.3 grams of final particles were obtained.

Reaction data is listed in Table 16.

methylenebisacrylamide, 0.7550 g of 2-acrylamido-2-methylpropane sulfonic acid (AMPSA) and 50.0 g of de-oxygenated water were added into the flask. The flask was sealed and purged with nitrogen for 15 minutes with moderate stirring. Then 0.7685 g of cerium (IV) ammonium nitrate (CAN) was added and the slurry was mixed for another 5 minutes. The reaction temperature was raised from room temperature to 70° C. in 50 minutes and the reaction was held at 70° C. for 3 hours. After the reaction, 15 ml of 1 M $H_2SO_4$ was added to quench the reaction. The particles were separated by filtration and then washed with 1 M $H_2SO_4$ for 10 times. 50 ml of acid solution was added for each wash. After the acid wash, the particles were washed

TABLE 16

Examples of Hydrophilic Coating by PEGylation

| Example | Base particle | PEG name | Particle g | PEG charge g | Boron trifluoride diethyl etherate g | Found hydrophilic layer (wt %) |
|---|---|---|---|---|---|---|
| 10A | example 1B | diethylene glycol | 45.1 | 226.0 | 6.0 | 3.0 |
| 10B | example 1D | ethylene glycol | 16.0 | 80.0 | 3.0 | 2.5 |
| 10C | example 1D | diethylene glycol | 56.7 | 283.5 | 11.0 | 2.8 |
| 10D | example 1D | triethylene glycol | 16.0 | 80.0 | 2.9 | 3.0 |
| 10E | example 1D | tetraethylene glycol | 16.4 | 80.1 | 3.0 | 3.5 |
| 10F | example 1J | PEG600 | 40.9 | 200.0 | 7.5 | 3.2 |

Raw materials charge for hydrophilic coating, g

Example 11

Example 11 describes the synthesis of strong cation exchange material from the hydrophilic coated particles described in example 7, example 8 and example 9.

In a typical reaction (example 11F), 5.0 g of hydrophilic coated particles were placed into a 100 ml of round bottom flask equipped an overhead stirring motor, stirring shaft and stir blade, a water cooled condenser, nitrogen inlet and thermo probe controlled heating mantle. 0.1851 g of N,N'- with water until pH>4. Lastly, the particles were washed with methanol for three times. The obtained particles were dried under vacuum at 45° C.

Reaction and analytical data are listed in Table 17.

The cationic capacity was determined by titrating the H form resins with 0.01 N NaOH. The anionic capacity was determined by titrating the OH form resins with 0.01 N HCl.

TABLE 17

Strong cation exchange materials 11A to material 11U

| Example | Hydrophic coated particle | Inert monomer Name | Raw materials charge for reactions, g | | | | | Final product ionic Capacity ueq/g |
|---|---|---|---|---|---|---|---|---|
| | | | Particle | AMPSA | Bis | Inert monomer | CAN | Water | |
| 11A | example 8 | None | 9.0 | 7.26 | 0.00 | N/A | 0.84 | 72.6 | 144.7 |
| 11B | example 8 | None | 9.0 | 5.56 | 0.00 | N/A | 0.84 | 72.6 | 121.6 |
| 11C | example 7B | None | 7.0 | 2.11 | 0.16 | N/A | 1.08 | 70.0 | 114.1 |
| 11D | example 7B | None | 7.0 | 1.40 | 0.21 | N/A | 1.08 | 70.0 | 118.2 |
| 11E | example 7B | None | 7.0 | 1.41 | 0.34 | N/A | 1.07 | 70.0 | 127.9 |
| 11F | example 7B | None | 5.0 | 0.76 | 0.19 | N/A | 0.77 | 50.0 | 121.0 |
| 11G | example 7B | None | 5.0 | 0.50 | 0.12 | N/A | 0.77 | 50.0 | 106.0 |
| 11H | example 7B | None | 15.0 | 1.50 | 0.38 | N/A | 2.30 | 150.0 | 84.6 |
| 11I | example 7C | None | 15.0 | 3.00 | 0.77 | N/A | 2.30 | 150.0 | 78.8 |
| 11J | example 7C | None | 15.0 | 4.50 | 1.13 | N/A | 2.31 | 150.0 | 113.6 |
| 11K | example 7C | acrylamide | 7.0 | 1.41 | 0.35 | 0.3509 | 1.08 | 70.0 | 79.3 |
| 11L | example 7C | DMA | 7.0 | 1.40 | 0.35 | 0.962 | 1.07 | 70.0 | 95.4 |
| 11M | example 7C | DPAM | 7.0 | 1.40 | 0.35 | 1.023 | 1.08 | 70.0 | 100.8 |
| 11N | example 9A | None | 12.0 | 10.90 | 0.00 | N/A | 1.12 | 96.8 | 79.6 |
| 11O | example 9E | None | 9.0 | 2.67 | 0.00 | N/A | 0.84 | 62.6 | 64.4 |
| 11P | example 9F | None | 9.0 | 2.13 | 0.04 | N/A | 0.84 | 82.6 | 67.1 |
| 11Q | example 9E | None | 7.0 | 1.41 | 0.35 | N/A | 1.08 | 70.0 | 109.9 |
| 11R | example 9E | None | 7.0 | 1.40 | 0.35 | N/A | 1.08 | 70.0 | 120.9 |
| 11S | example 9F | DPAM | 9.0 | 1.80 | 0.45 | 0.54 | 1.38 | 90.0 | 117.8 |
| 11T | Example 9I | DPAM | 9.0 | 1.80 | 0.45 | 0.54 | 1.38 | 90.0 | 120.0 |
| 11U | example 9I | DPAM | 9.0 | 1.80 | 0.45 | 0.54 | 1.38 | 90.0 | 93.7 |

Example 12

Example 12 describes the synthesis of weak cation exchange material from the hydrophilic coated particles described in example 7 and example 9.

In a typical reaction (example 12A), 6.0 g of hydrophilic coated particles were placed into a 100 ml of round bottom flask equipped an overhead stirring motor, stirring shaft and stir blade, a water cooled condenser, nitrogen inlet and thermal probe controlled heating mantle. 0.0905 g of N,N'-methylenebisacrylamide, 0.6008 g of sodium acrylate and 60.0 g of de-oxygenated water were added into the flask. The flask was sealed and purged with nitrogen for 15 minutes with moderate stirring. Then 0.9217 g of cerium (IV) ammonium nitrate was added and the slurry was mixed for another 5 minutes. The reaction temperature was raised from room temperature to 70° C. in 50 minutes and the reaction was held at 70° C. for 3 hours. After the reaction, 15 ml of 1 M $H_2SO_4$ was added to quench the reaction. The particles was separated by filtration and then washed with 1 M $H_2SO_4$ for 10 times. 50 ml of acid solution was added for each wash. After the acid wash, the particles were washed with water until pH>4. Lastly, the particles were washed with methanol for three times. The obtained particles were dried under vacuum at 45° C. overnight.

Reaction data is listed in Table 18.

The ionic capacity was determined by titrating the H form resins with 0.01 N NaOH.

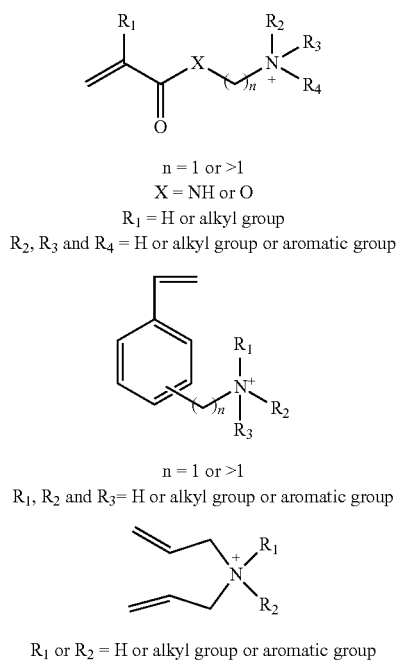

n = 1 or >1
X = NH or O
$R_1$ = H or alkyl group
$R_2$, $R_3$ and $R_4$ = H or alkyl group or aromatic group n = 1 or >1
$R_1$, $R_2$ and $R_3$ = H or alkyl group or aromatic group $R_1$ or $R_2$ = H or alkyl group or aromatic group

TABLE 18

Weak cation exchange materials 12A to material 12O

| Example | Hydrophic coated particle | Inert monomer | Acidic monomer | Particle | Acidic Monomer | Bis | Inert monomer | CAN | 0.243N HNO3 | Final product ionic Capacity ueq/g |
|---|---|---|---|---|---|---|---|---|---|---|
| 12A | Example 9E | None | sodium acrylate | 6 | 0.60 | 0.09 | N/A | 0.92 | 60.0 | 105.4 |
| 12B | Example 9E | None | sodium acrylate | 6 | 1.20 | 0.18 | N/A | 0.92 | 60.0 | 137.8 |
| 12C | Example 9E | None | sodium acrylate | 6 | 1.80 | 0.27 | N/A | 0.92 | 60.0 | 504.7 |
| 12D | 7D | None | sodium acrylate | 6 | 1.80 | 0.45 | N/A | 0.92 | 60.0 | 662.5 |
| 12E | Example 7D | None | sodium acrylate | 6 | 1.20 | 0.30 | N/A | 0.92 | 60.0 | 446.2 |
| 12F | Example 7D | None | sodium acrylate | 6 | 0.90 | 0.23 | N/A | 0.92 | 60.0 | 292.2 |
| 12G | Example 7D | None | sodium acrylate | 6 | 0.60 | 0.15 | N/A | 0.92 | 60.0 | 171.3 |
| 12H | Example 7D | Acrylamide | sodium acrylate | 6 | 0.60 | 0.15 | 0.1502 | 0.92 | 60.0 | 152.4 |
| 12I | Example 7D | DMA | sodium acrylate | 6 | 0.60 | 0.15 | 0.2095 | 0.92 | 60.0 | 166.3 |
| 12J | Example 7D | MPAM | sodium acrylate | 6.0 | 0.60 | 0.15 | 0.3026 | 0.92 | 60.0 | 171.6 |
| 12K | Example 7D | None | mono-2-(methacryloyloxy)ethyl succinate | 6.0 | 0.60 | 0.15 | 0.3026 | 0.92 | 60.0 | 199.7 |
| 12L | Example 7D | None | mono-2-(methacryloyloxy)ethyl succinate | 6.0 | 0.60 | 0.15 | 0.3026 | 0.92 | 60.0 | 143.3 |
| 12M | Example 7D | None | sodium acrylate | 6.0 | 0.42 | 0.11 | N/A | 0.92 | 60.0 | 116.3 |
| 12N | Example 7D | None | 2-carboxyethyl acrylate | 6.0 | 0.64 | 0.11 | N/A | 0.92 | 60.0 | 207.7 |
| 12O | Example 7D | None | 2-Carboxyethyl acrylate oligomer | 6.0 | 0.76 | 0.11 | N/A | 0.92 | 60.0 | 180.3 |

Example 13 Monomers for Anion Exchanger Synthesis

Anion exchange resins can be made by following the similar procedure but replacing sodium acrylate in example 12 with one or more than one monomers selected from but not limited to the monomers in the following.

Example 14 Monomers for Zwitterion Exchanger Synthesis

Zwitterion exchange resins can be made by following the similar procedure but replacing sodium acrylate in example 12 with one or more monomers selected from, but not limited to the monomers in the following.

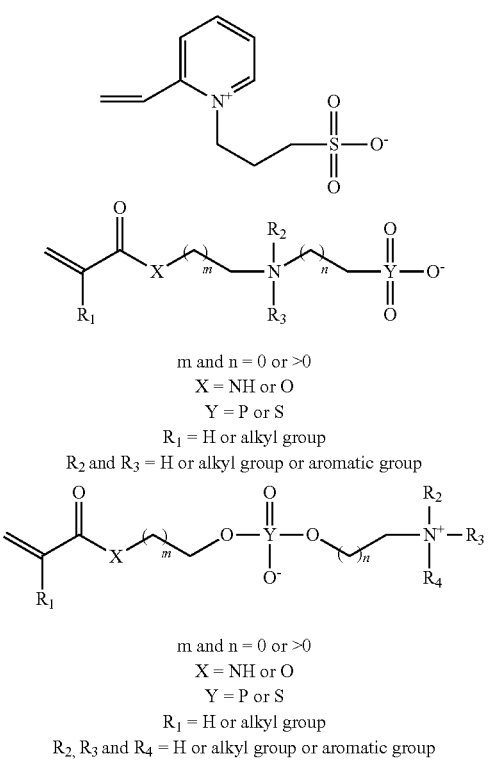

m and n = 0 or >0
X = NH or O
Y = P or S
R₁ = H or alkyl group
R₂ and R₃ = H or alkyl group or aromatic group m and n = 0 or >0
X = NH or O
Y = P or S
R₁ = H or alkyl group
R₂, R₃ and R₄ = H or alkyl group or aromatic group Example 15

In a typical reaction, 183.3 g of reagent alcohol (90% ethanol, ~5% methanol and ~5% isopropanol), 22.5 grams of toluene, 6.2 g of polyvinylpyrrolidone (PVP-40, average molecular weight 40,000), 0.49 g of 2,2'-Azobis(2-methylpropionitrile) (AIBN) and 24.9 g of glycidyl methacrylate were charged into a flask equipped with mechanical agitation, condenser, a heating mantle and a thermocouple. After the solution was purged with nitrogen for a minimum of 15 minutes, the agitation speed was adjusted to 75 rpm and the reaction was heated from room temperature to 70° C. The reaction was held at 70° C. until the completion of the reaction.

After one hour at 70° C., a solution containing 24.9 g of ethylene glycol dimethacrylate, 9.5 of toluene and 77.8 grams of reagent alcohol (90% ethanol, ~5% methanol and ~5% isopropanol) was added to the reaction at a constant flow rate over 95 minutes.

After the completion of the charge of the above solution, 6.2 grams of 2-Acrylamido-2-methylpropane sulfonic acid (AMPSA) was added to the reaction as a single aliquot.

After holding at 70° C. for 20 hours, the reaction was cooled, and the particles were separated from the reaction slurry by filtration and the filtrate was discharged. The particles were then washed with 200 g of methanol and the solvent was removed. The methanol wash was repeated two times. The particles were further washed with 3×200 g of tetrahydrofuran (THF)

The final product was dried in vacuum oven at 45° C. overnight. 58.2 g of monodisperse 2.3 μm polymer particles were obtained.

The dried particles were charged into a 500 ml of round bottom flask equipped with mechanical agitation, condenser, heating mantle and thermocouple. 300 ml of 0.5 M sulfuric acid was then added, and the mixture was heated to 60° C. and held for 20 hrs. The hydrolyzed particles were filtered and washed with water to neutral followed by methanol. The particles were dried in vacuum oven at 45° C. overnight Reaction data is listed in Table 19. Specific changes to this general procedure is the amount of 2-Acrylamido-2-methylpropane sulfonic acid (AMPSA) used to manipulate the charge density characterized by ionic capacity as shown in Table 20.

TABLE 19

A one-pot reaction to synthesize cation exchanger with gradient composition

| | Necleation solution, g | | | | | Crosslinking solution, g | | | Functional layer |
|---|---|---|---|---|---|---|---|---|---|
| Example | GMA | Toluene | AIBN | PVP-40 | Reagent alcohol | EDMA | Toluene | Reagent alcohol | AMPSA |
| 15A | 24.9 | 22.5 | 0.49 | 6.2 | 183.8 | 24.9 | 9.5 | 77.8 | 6.2 |
| 15B | 24.9 | 22.5 | 0.49 | 6.2 | 183.8 | 24.9 | 9.5 | 77.8 | 4.0 |
| 15C | 24.9 | 22.5 | 0.49 | 6.2 | 183.8 | 24.9 | 9.5 | 77.8 | 2.0 |
| 15D | 24.9 | 22.5 | 0.49 | 6.2 | 183.8 | 24.9 | 9.5 | 77.8 | 1.0 |

TABLE 20

Analytical data for cation exchangers synthesized by one-pot reaction

| | Particle size | | | | Primer | Core | |
|---|---|---|---|---|---|---|---|
| Example | $d_{v50}$ μm | $d_{n50}$ μm | $d_{v50}/d_{n50}$ | $d_{v90}/d_{v10}$ | quantification N % | crosslinker % (wt %) | Ionic capacity (umol/g) |
| 15A | 2.38 | 2.36 | 1.01 | 1.16 | 0.57 | 100.0 | 318.0 |
| 15B | 2.56 | 2.53 | 1.01 | 1.16 | 0.41 | 100.0 | 204.0 |
| 15C | 2.18 | 2.15 | 1.01 | 1.16 | 0.29 | 100.0 | 121.0 |
| 15D | 2.20 | 2.18 | 1.01 | 1.16 | 0.20 | 100.0 | 54.0 |

Example 16

Particles with thermo-responsive or pH-responsive surface can be made by following the procedure of example 12. but replacing sodium acrylate with one or more monomers selected from, but not limited to the following monomers:

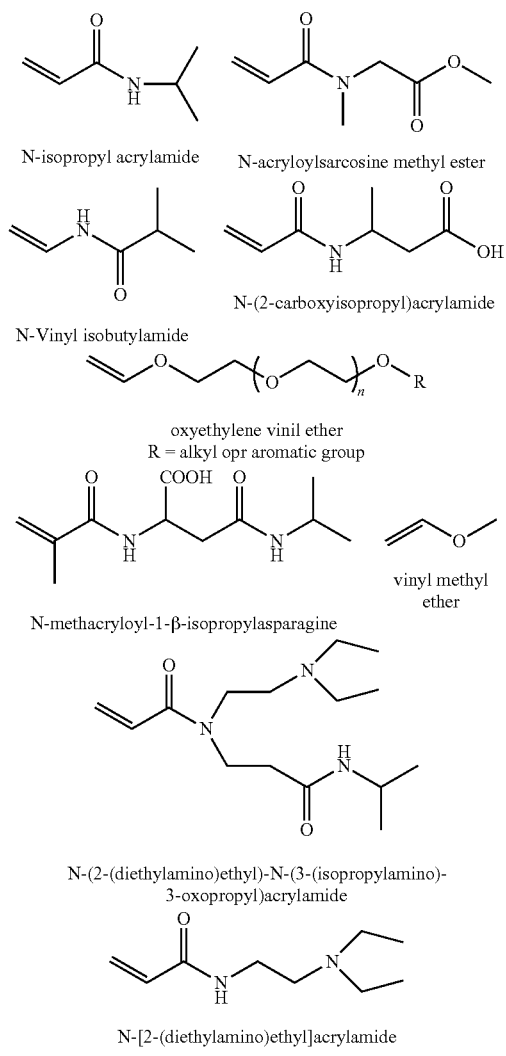

Example 17

Particles with hydrophobic surface can be made by reacting the particles in example 8 or example 9 or example 10 with the monomers bearing hydrophobic interaction groups in either organic solution or aqueous solution.

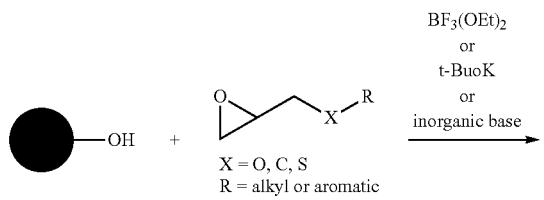

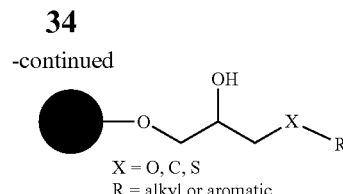

X = O, C, S
R = alkyl or aromatic

Synthesis of Particles with Hydrophobic Interaction Surface by Surface Derivatization

Example 18

Particles with hydrophobic surface can be made by following the procedure of example 12, but replacing sodium acrylate with one or more monomers selected from, but not limited to, the following:

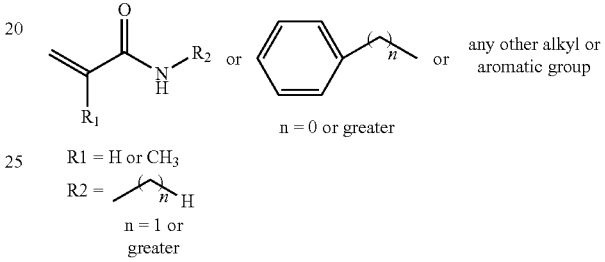

Monomer Examples for the Synthesis of Particles with Hydrophobic Surface

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents are considered to be within the scope of this invention and are covered by the following claims.

The invention claimed is:

1. A non-porous polymer particle comprising a core having a center, a first layer, a second layer, and a particle surface, wherein:
   the core comprises polystyrene, and wherein the core has a diameter greater than 0.1 micron;
   the first layer extends radially from the core to an outer diameter, the first layer comprising a first polymer comprising units derived from styrene and units derived from divinylbenzene (DVB), wherein said first polymer is crosslinked with said units derived from DVB, wherein the first layer comprises a gradient of said units derived from DVB, and wherein an extent of crosslinking increases with radius;
   the second layer extends radially from the outer diameter of the first layer to the particle surface, the second layer comprising a second polymer comprising units derived from glycidyl methacrylate (GMA) and units derived from ethylene glycol dimethacrylate (EDMA), wherein said second layer comprises a gradient of said units derived from GMA and said units derived from EDMA, and wherein a ratio of concentration of said units derived from GMA and said units derived from EDMA in the second layer to units derived from styrene and units derived from DVB in the first layer increases with radius, such that the particle surface consists essentially of polymerized GMA/EDMA.

2. The particle of claim 1, wherein the core is not crosslinked.

3. The particle of claim 1, wherein up to 3% by weight of the polystyrene in the core is crosslinked with DVB.

4. The particle of claim 1, further comprising a hydrophilic coating layer comprising a polymer comprising units derived from glycidol and units derived from glycerol triglycidyl ether (GTGE), wherein the hydrophilic coating layer is disposed on the particle surface to form an exterior surface.

5. The particle of claim 4, having an average particle size in a range from about 1.5 to about 10 microns.

6. The particle of claim 4, having an average particle size in a range from about 1.7 to about 5 microns.

\* \* \* \* \*